(12) United States Patent  (10) Patent No.: US 7,652,830 B2
Matsui et al.  (45) Date of Patent: Jan. 26, 2010

(54) LENS BARREL AND PHOTOGRAPHING APPARATUS

(75) Inventors: Kazuaki Matsui, Osaka (JP); Yoshifumi Mitani, Sakai (JP)

(73) Assignee: Konica Minolta Opto, Inc., Tokyo (JP)

( * ) Notice: Subject to any disclaimer, the term of this patent is extended or adjusted under 35 U.S.C. 154(b) by 186 days.

(21) Appl. No.: 11/893,763

(22) Filed: Aug. 17, 2007

(65) Prior Publication Data

US 2008/0049340 A1 Feb. 28, 2008

(30) Foreign Application Priority Data

Aug. 22, 2006 (JP) .............................. 2006-225122

(51) Int. Cl.
*G02B 15/14* (2006.01)

(52) U.S. Cl. ...................... 359/704; 359/694; 359/696; 359/703; 359/822

(58) Field of Classification Search ......... 359/694–704, 359/819–824, 811, 642, 822–826; 396/72–87, 396/341–350
See application file for complete search history.

(56) References Cited

U.S. PATENT DOCUMENTS

| 6,618,212 B2 | 9/2003 | Chikami et al. |
| 6,850,373 B2 | 2/2005 | Mihara et al. |
| 2006/0285221 A1 | 12/2006 | Bito et al. |
| 2007/0183065 A1 | 8/2007 | Chigasaki et al. |
| 2007/0183766 A1 | 8/2007 | Miyamori et al. |

FOREIGN PATENT DOCUMENTS

| JP | 06-324247 | 11/1994 |
| JP | 10282559 A | * 10/1998 |
| JP | 11-119078 | 4/1999 |
| JP | 11119078 A | * 4/1999 |
| JP | 2000111779 A | * 4/2000 |
| JP | 2000-131610 | 5/2000 |
| JP | 2004-102089 | 4/2004 |

* cited by examiner

*Primary Examiner*—Darryl J Collins
*Assistant Examiner*—Zachary Wilkes
(74) *Attorney, Agent, or Firm*—Brinks Hofer Gilson & Lione

(57) ABSTRACT

A lens barrel is provided with: a first movable frame and a second movable frame of a plurality of movable frames that are coaxially disposed to be movable back and forth to a stationary main frame and are inserted telescopically into the stationary frame; and two U-shaped support and drive members each having a first engagement portion, wherein each of the support and drive members is constituted of two arm portions, a second engagement portion, and a coupling member which connects the two arm portions. The first movable frame is driven by one of the support and drive members, and the second movable frame and the first movable frame are engaged with each other.

16 Claims, 19 Drawing Sheets

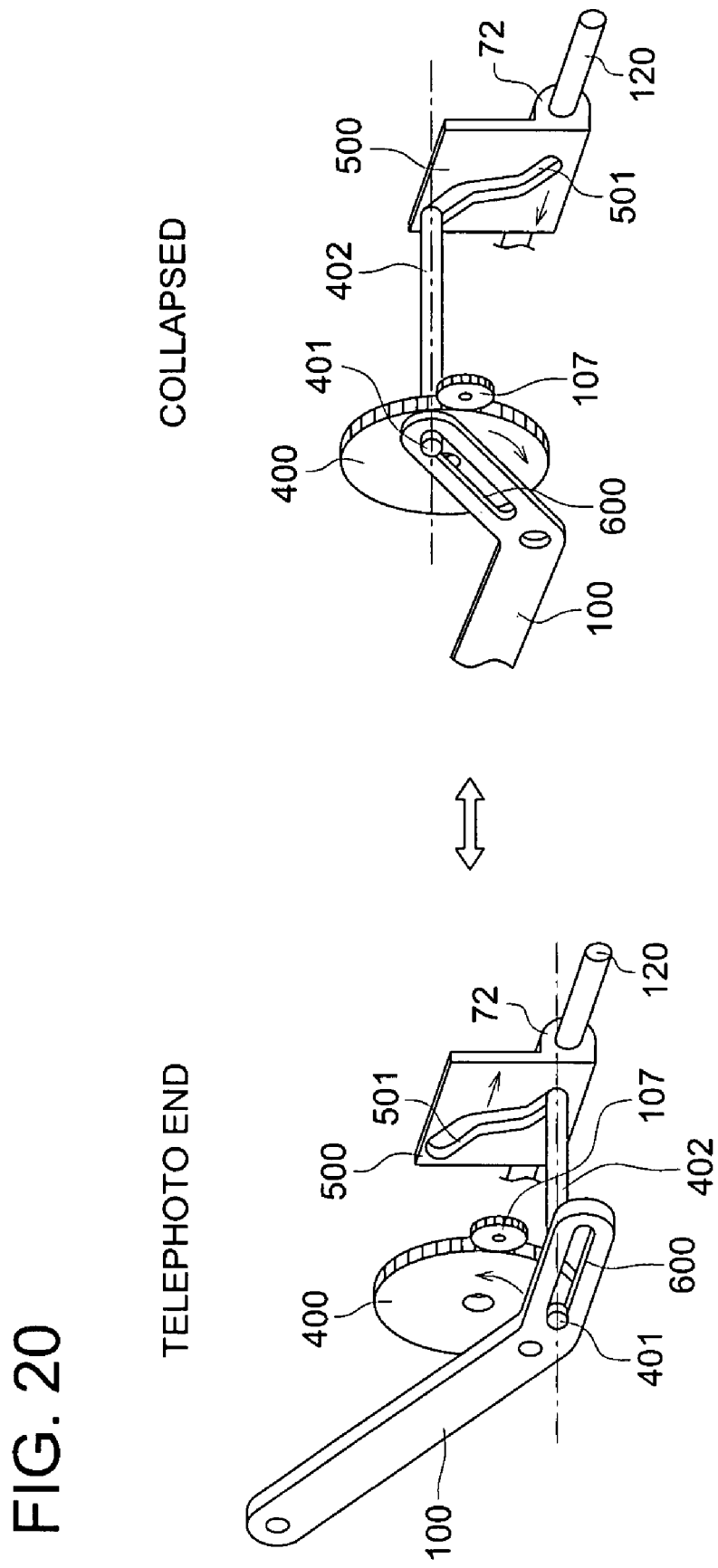

LENS BARREL AND PHOTOGRAPHING APPARATUS

This application is based on Japanese Patent Application No. 2006-225122 filed on Aug. 22, 2006, which is incorporated hereinto by reference.

BACKGROUND OF THE INVENTION

This invention relates to a lens unit and a photographing apparatus, and relates in particular to a lens unit equipped with a zooming mechanism of a bending optical system.

In recent years, as personal computers have become more widely used, digital cameras in which images can be easily taken in to personal computers have also become widespread. In addition, it is becoming commonplace for digital cameras to be incorporated into information processing devices such as mobile computers, cellular phones, and personal digital assistants (PDAs). As digital cameras have become more widespread, there has been a desire for more compact digital cameras, and the lens unit needs to be even more compact. There is also a demand for a high magnification zoom lens and a zooming mechanism that can be used with the high magnification zoom lens is needed.

Thus, an example in which the barrel for holding the lens is telescopically stored in order to make the lens unit more compact is a movable frame posture restraining mechanism which includes a stationary main frame; a movable frame that is inserted telescopically into the stationary frame and which can move back and forth to the stationary main frame along the direction of an optical axis; a first shaft that is formed of two first pins which are orthogonal in the direction of movement of the movable frame and which coaxially project from the outer peripheral surface of the movable frame to the opposite sides at substantially 180° with respect to each other; a second shaft that is formed of two second pins which are orthogonal in both the direction of movement of the movable frame and the direction in which the first shaft extends and which coaxially project from the outer peripheral surface of the movable frame to the opposite sides at substantially 180° with respect to each other; a first holding mechanism which has two arms that are formed with one end supported so as to be swingable about the parallel axis in the direction of extension of the first pin and which engages with the first shaft at the swing tip side, and which holds the first shaft during movement of the movable frame and keeps the perpendicular posture of the first shaft with respect to the direction of movement of the movable frame; and a second holding mechanism which has two arms that are formed with one end supported so as to be swingable about the parallel axis in the direction of extension of the second pin and which engages with the second shaft at the swing tip side, and which holds the second shaft which is to prevent rotational movement of the first shaft of the movable frame which occurs due to movement of the movable frame and keeps the orthogonal posture of the second shaft with respect to the first shaft (Refer to Unexamined Japanese Patent Application Publication No. 11-119078).

In addition, there is a camera in which the lens barrel is formed from three units which include the stationary barrel which forms a portion of the camera body; the middle barrel which is stored telescopically inside the stationary barrel; and the movable barrel which is also stored telescopically inside the middle barrel, and the inner surface of the stationary barrel has a two-group type zoom device on which a helicoid groove is formed. More specifically, the engagement portion provided on the end portion of the middle barrel is engaged with the helicoid groove. The middle barrel can rotate in both normal and reverse directions via a gear mechanism using a direct current motor, and it moves telescopically with respect to the stationary barrel by the rotation. Further, the helicoid grooves are also formed on the inner surface of the middle barrel and the engagement portion of the end portion of the movable barrel engages with the helicoid grooves. The movable barrel cannot rotate with respect to the stationary barrel and thus when the middle barrel is rotated, it moves telescopically in the same direction as the telescopic movement of the middle barrel (See Unexamined Japanese Patent Application Publication No. 06-324247).

It is to be noted that the lens barrel is telescopically stored and the state of being stored inside the camera body is called collapsed.

However, in the posture restraining mechanism of the movable frame described in Japanese Patent No. 3666207, a structure is described in which one movable frame can move with respect to the stationary main frame, but in order to be usable with the high magnification zoom lens of recent years, it is necessary, for example, to increase the length of the arm portion in order to match the zooming mechanism which moves the zoom lens group toward the object side in large dimensions that is closest to the object of the zoom lens and it thus difficult for the length of the arm to be made compact corresponding to the reduced size of the zoom lens. Moreover, there is no disclosure with regard to two or more movable frames.

In addition, the two-group type zooming device described in Unexamined Japanese Patent Application Publication No. 06-324247, is a three unit structure, but it is necessary to form helicoid grooves on the inner surface of the stationary barrel and the middle barrel, and it is also necessary to form helicoid grooves on the end outer surface of the middle barrel and the end outer surface of the movable barrel which engage with these, and thus the mechanism becomes complex. Further, the barrels must be cylindrical because they have helicoid grooves. For this reason, the lens barrel which should correspond to the reduced size resulting from recent zoom lens cannot be made square to match the square shape of the image pickup element.

The present invention was conceived in view of the foregoing and an object thereof is to provide lens barrel which has a compact multilevel collapsing is possible with a simple structure and a photographing apparatus which comprises this lens barrel.

SUMMARY OF THE INVENTION

The above problems can be solved by one of the following structures.

According to one embodiment of the present invention, a lens barrel which holds a lens, includes: a stationary main frame; a plurality of movable frames that are coaxially disposed to be movable back and forth to the stationary main frame in a direction of an optical axis of the lens barrel and are inserted telescopically into the stationary frame, the plurality of movable frames including; a first movable frame, which moves to a farthest position away from the stationary main frame, and a second movable frame which moves to a farther position next to the position where the first movable frame moves to the farthest position away from the stationary main frame, being engaged with the first movable frame; and two U-shaped support and drive members each having a first engagement portion, which is rotatably engaged with a periphery of the first movable frame on the same plane or two planes perpendicular to the optical axis, pivots of the support and drive members being orthogonal to each other, wherein each of the support and drive members comprises two arm portions which are engaged with the first movable frame at the first engagement portion, a second engagement portion which is engaged with the stationary main frame on an opposite side of the first engagement portion, and a coupling member which connects the two arm portions, wherein the second engagement portion is pivotally supported on the stationary main frame, the first movable frame is driven by at least one of the support and drive members.

According to another embodiment of the present invention, a lens unit is provided with a lens system which forms an image of an photographic object on an image pickup surface of an image pickup element, the lens system including a first lens group to which light from the object is incident, and a bending member which bends an optical axis of the first lens group substantially at a right angle, the bending member is held insertably and removably with respect to the optical axis; and a lens system holding member which holds the lens system, including the lens barrel of claim 1, wherein the lens barrel of claim 1 holds the first lens group capable being moved back and forth in the direction of the optical axis, and capable of being collapsed.

BRIEF DESCRIPTION OF THE DRAWINGS

FIG. 1(a) is a schematic perspective view, while FIG. 1(b) is a rear view of the outside of the digital camera of this invention.

FIG. 20 is a schematic perspective view of the coupling member vicinity of the lens unit of the second embodiment of this invention in the telephoto state and the collapsed state.

DETAILED DESCRIPTION OF THE PREFERRED EMBODIMENT

Figure 1:
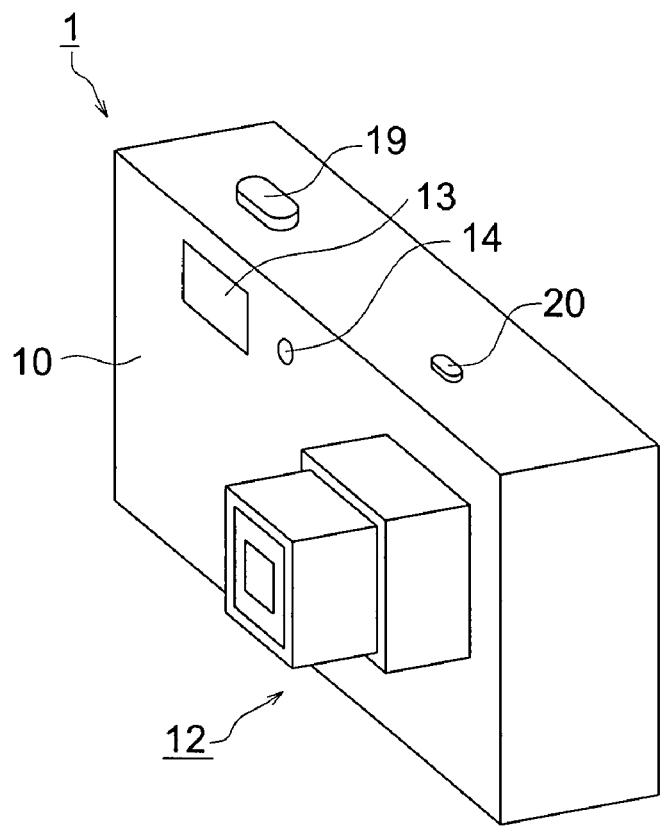
Figure 1:
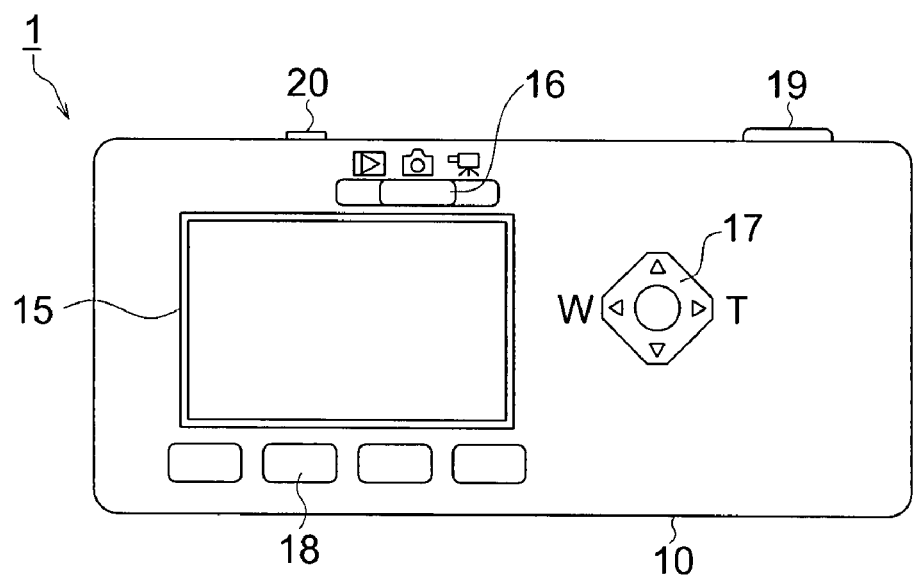

The embodiments of this invention will be described with reference to the drawings. The external view of the digital camera 1 is shown as a schematic view in FIGS. 1(a) and 1(b). FIG. 1(a) is a perspective view and FIG. 1(b) is a rear view.

The digital camera 1 is provided with a substantially rectangular camera body 10 and a lens unit 12 which is used by being projected from the camera body 10 at the time of photographing. The projection direction of the lens unit 12 is the depth direction, while the width direction of the camera body 10 is the width direction, and the vertical direction in FIGS. 1(a) and 1(b) is the longitudinal direction.

The digital camera 1 is provided with a lens unit 12, a flash emission section 13 and a self timer lamp 14 at its front surface, and a display section 15, a mode setting switch 16, a cross-shaped key 17 and a plurality of operation keys 18 at its back surface and a release button 19 and a power source button 20 at its top surface.

The lens unit 12 is the zoom lens, and when it is at the operating position, one portion of the lens projects from the front surface of the camera body 10 and then projects further when zooming is done from the wide-angle end to the telephoto end and the remaining lens portion is bent at substantially right angles to the optical axis by the bending member which is described hereinafter and arranged in the lateral direction inside the camera body 10. In addition, the portion of the lens that projects at the operating position is collapsed at the non-operating position when the photographing is not being done and is stored in the storing position inside the camera body 10.

The flash emission section 13 emits flash which irradiates an object. The self timer lamp 14 indicates that self-timed photography by blinking is in preparation.

The display section 15 which is at the rear surface comprises a liquid crystal display device, and in addition to the photographed image, the setting status of the digital camera 1 and various information for operation is displayed. The mode setting switch 16 is a slide type switch and is used in setting the operation modes such as photographing and playing for the digital camera. The cross-shaped key 17 has four contact points which are up, down, left and right, and is used in moving the cursor displayed on the display section 15. The cross-shaped key 17 is also used for adjusting the focal point distance of the lens unit 12. The operation key 18 switches the items to be displayed in the display section 15 and is used for setting related to selection of the displayed items and functions of the digital camera 1. The release button 19 operates at 2 levels and the half pressed state of the release button 19 gives instructions for preparation for photography of the image to be recorded, and the fully pressed state of the release button 19 gives instruction for photographing of the image to be recorded.

Figure 2:
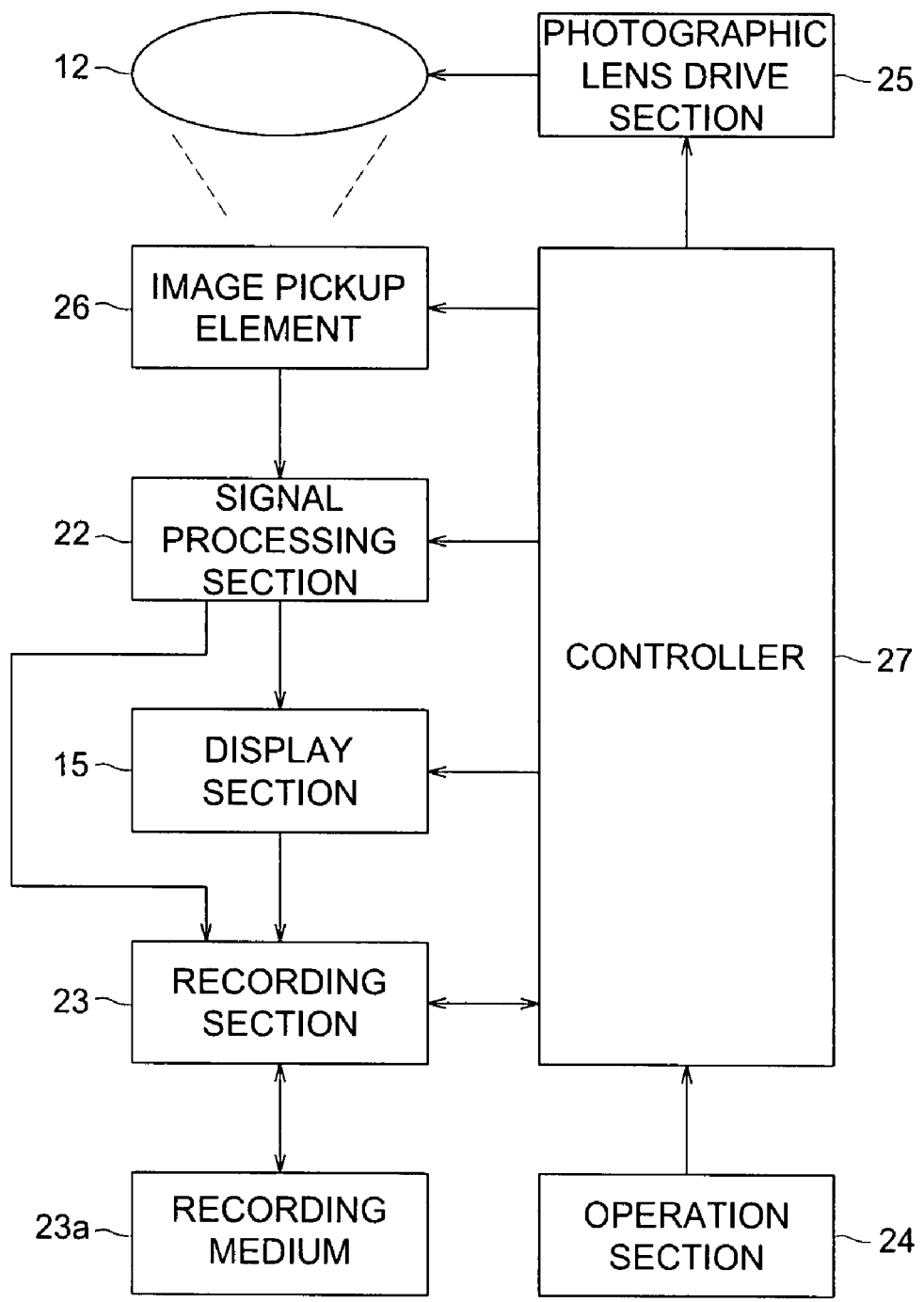
FIG. 2 is a schematic view of the structure of the digital camera of the invention.

FIG. 2 is a schematic view showing the structure of the digital camera 1. The digital camera 1 has a lens unit 12 and a display section 15 as well as a image pickup element 26, a signal processing section 22, a recording section 23, an operating section 24, a photographing lens drive section 25 and a control section 27. The image pickup element 26 is a CCD area sensor and it outputs signals which display the amount of light received for each pixel. The image processing section 22 processes the output signals from the image pickup element 26 and creates image data which displays the photographed image. The recording section 23 records the image data created by the image processing section 22 in a removable recording medium 23a and image data is read from the recording medium 23a for display of image reproduction and display. The operation section 24 comprises the mode setting switch 16, the cross-shaped key 17, the operation key 18, the release button 19 and the power button 20 and the information pertaining to the button operated by the user is transmitted to the control section 27.

The photographing lens control 25 controls the driving of motors such as the zoom motor, the focus motor, the shutter and aperture motor for adjusting light exposure amount. The photographing lens drive section 25 may also be provided at the lens unit 12.

The control section 27 has function which perform a series of operations which include controlling the operation of each part of the digital camera 1 based on a control program, and when the release button is half pressed, preparations for photographing the object such as setting of the exposure control value and focus adjustment are performed and when the release button 19 is fully pressed, the image pickup element 26 is exposed and the image signals obtained due to the exposure are subjected to prescribed image processing and recorded on the recording medium 23a.

First Embodiment

The structure of the lens unit 12 is described as the first embodiment.

Figure 3:
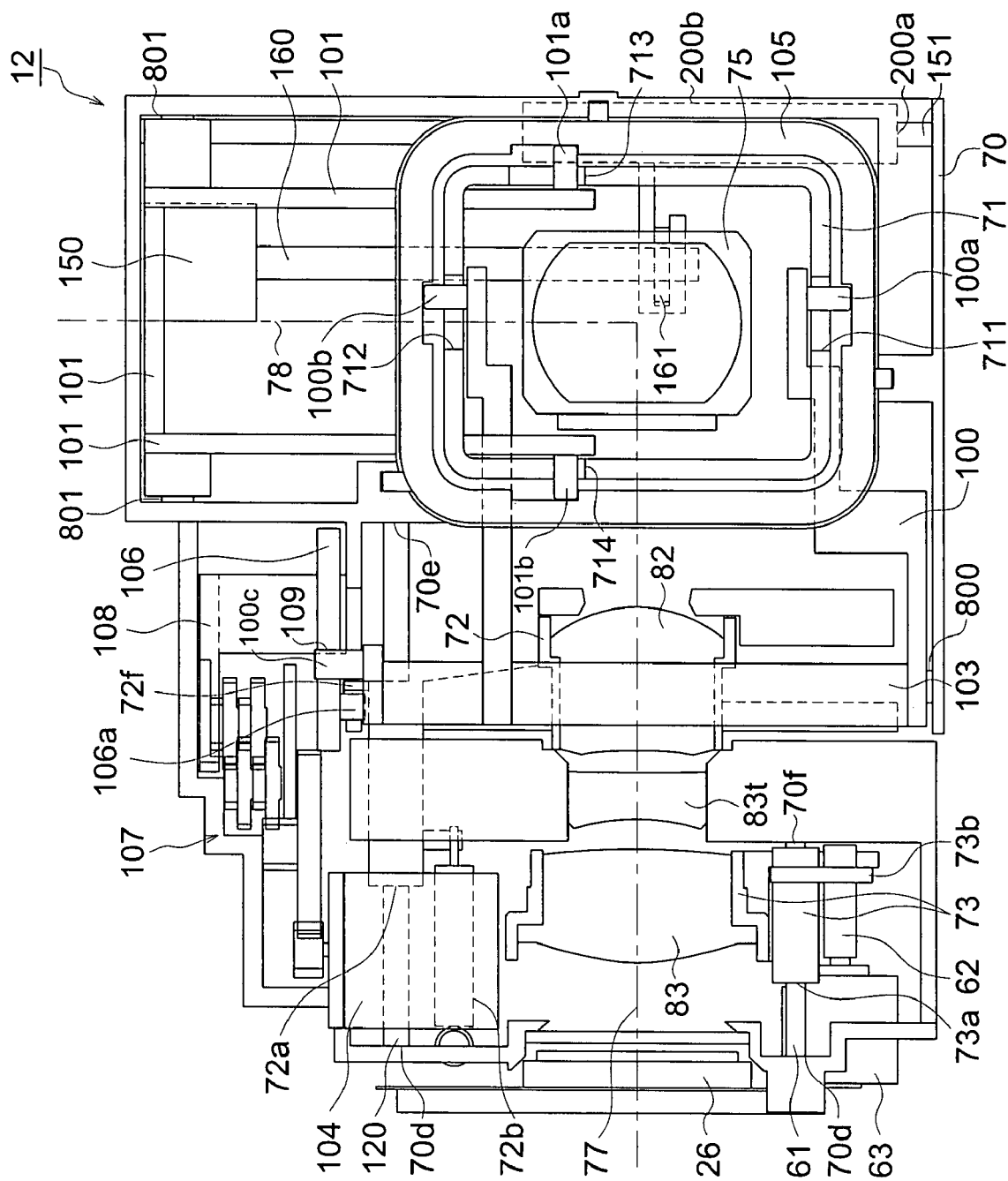
FIG. 3 is front view of the lens unit of the first embodiment of this invention.
Figure 4:
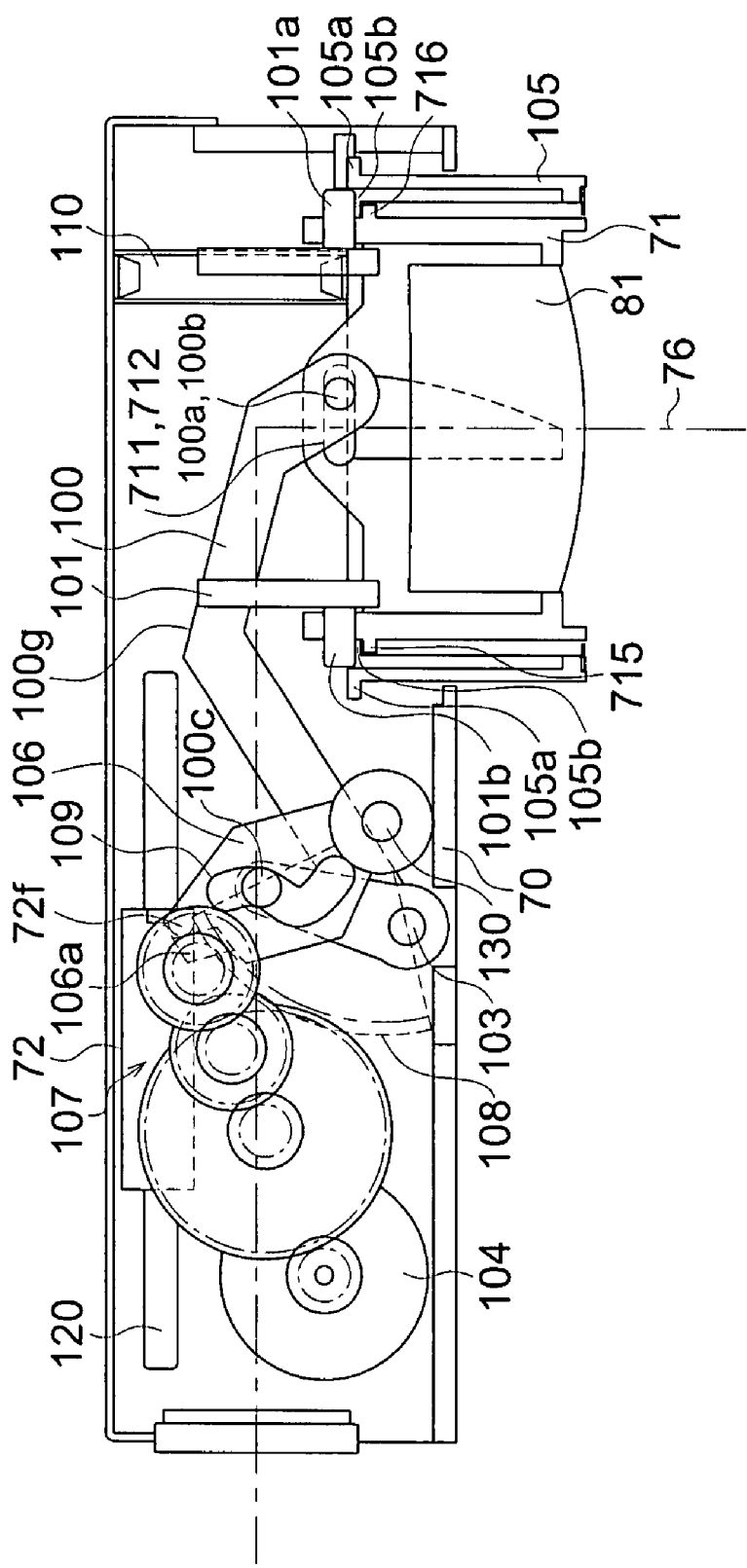
FIG. 4 is a side view of the lens unit of the first embodiment of this invention in the wide-angle state.
Figure 5:
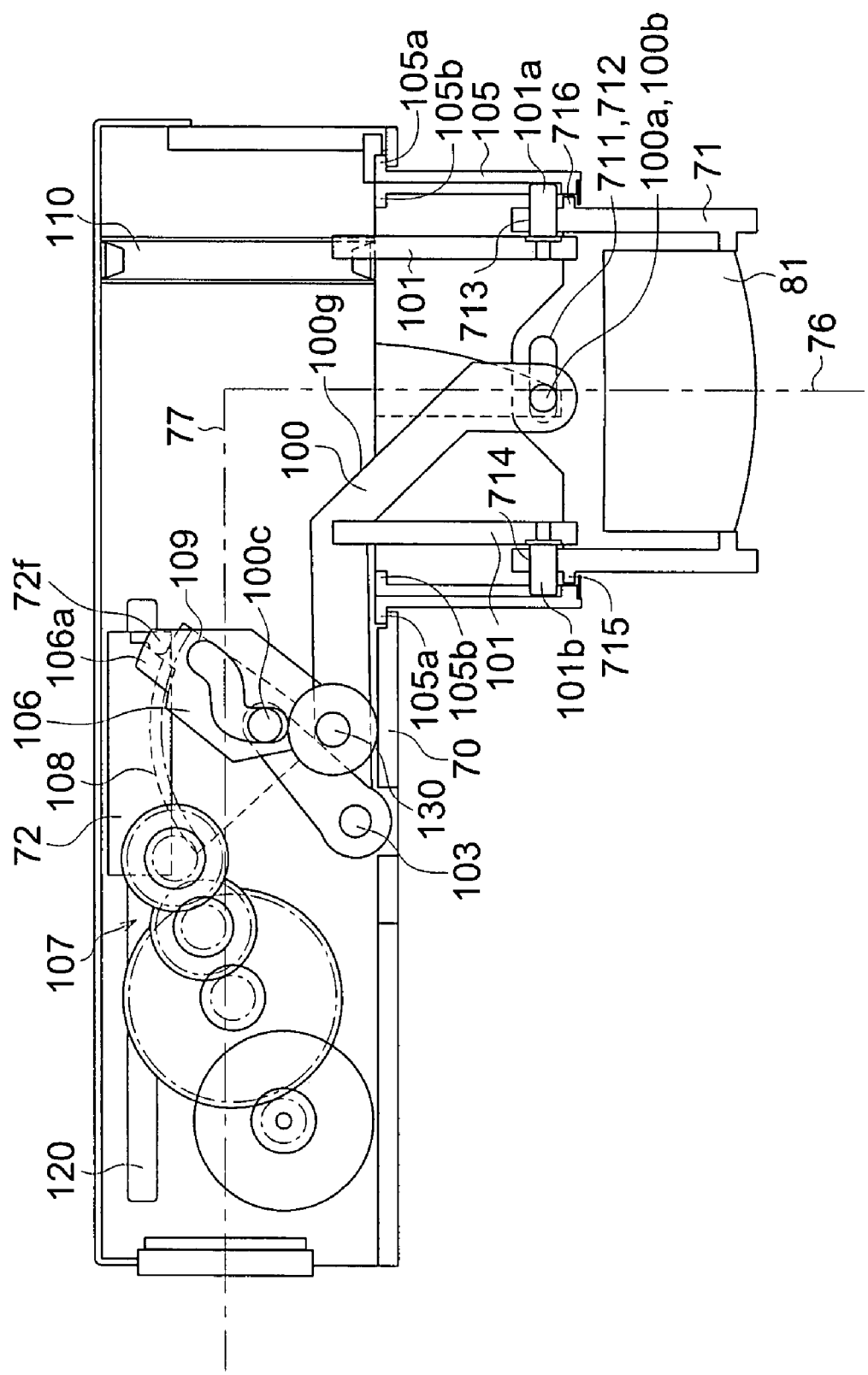
FIG. 5 is a side view of the lens unit of the first embodiment of this invention in the telephoto state.
Figure 6:
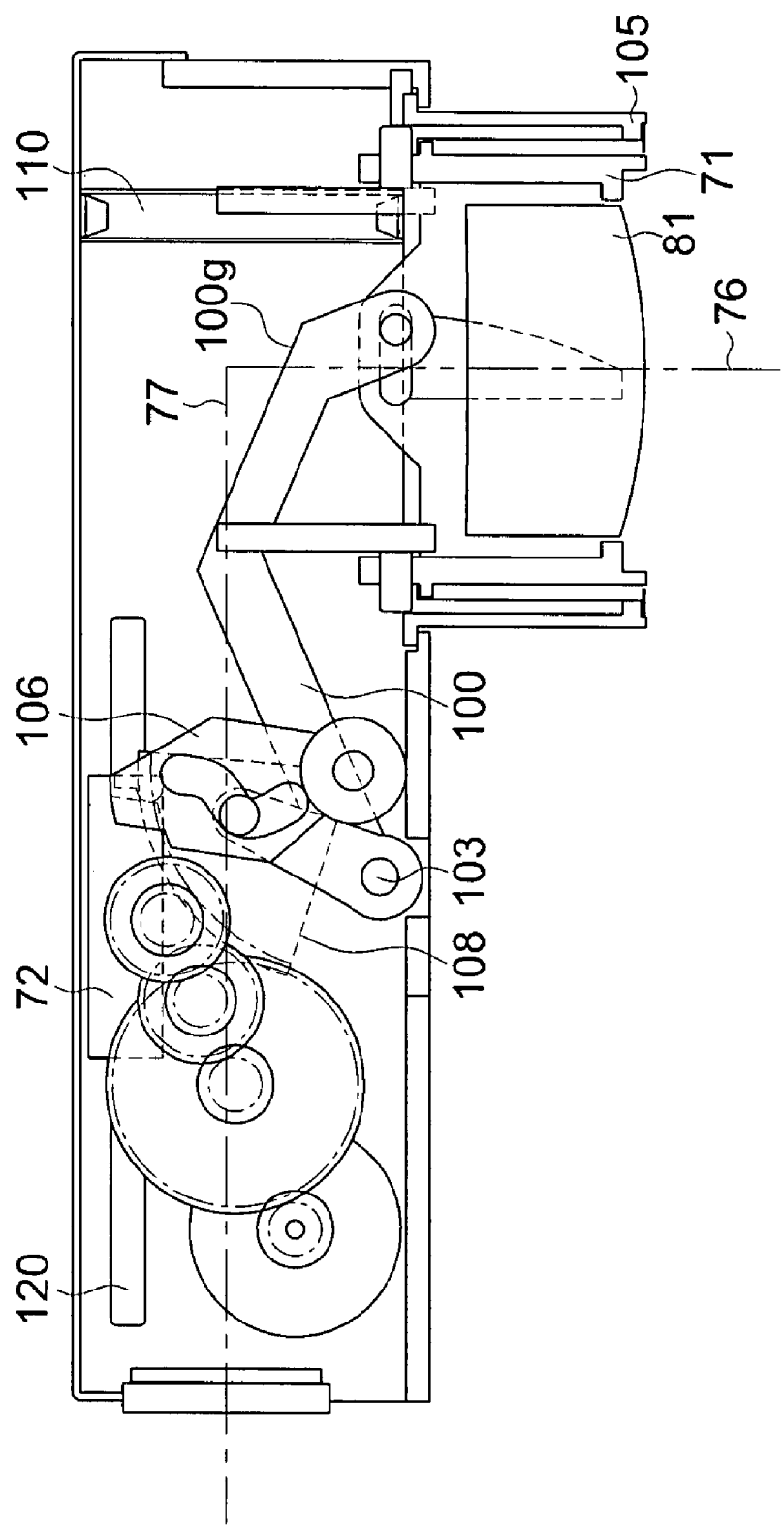
FIG. 6 is a side view of the lens unit of the first embodiment of this invention when collapsed or at the position where the first holding member is moved at startup time (bending member inserting and removing position).
Figure 7:
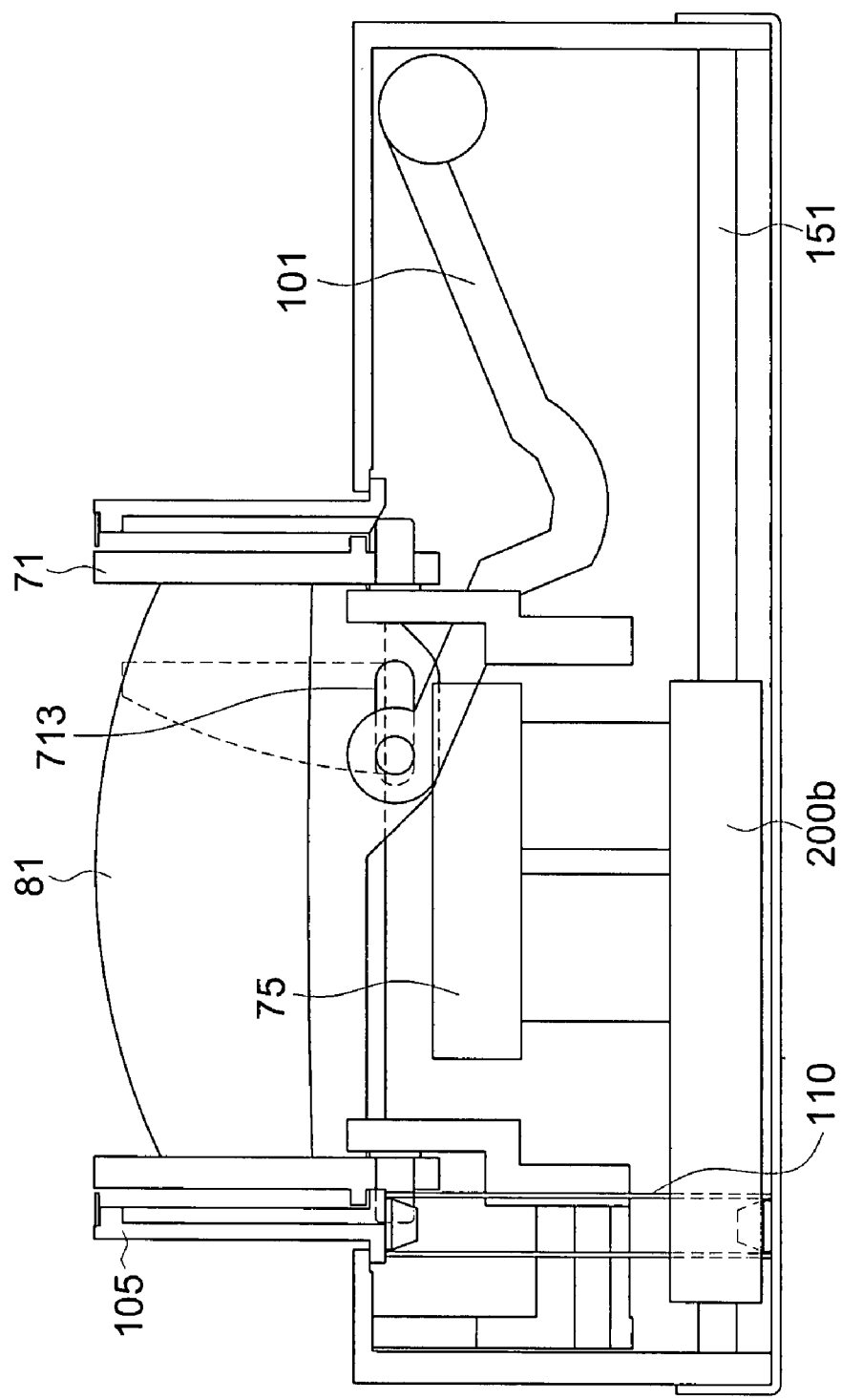
FIG. 7 is a top view of the lens unit of the first embodiment of this invention when collapsed or at the position where the first holding member is moved at startup time (prism inserting and removing position).
Figure 8:
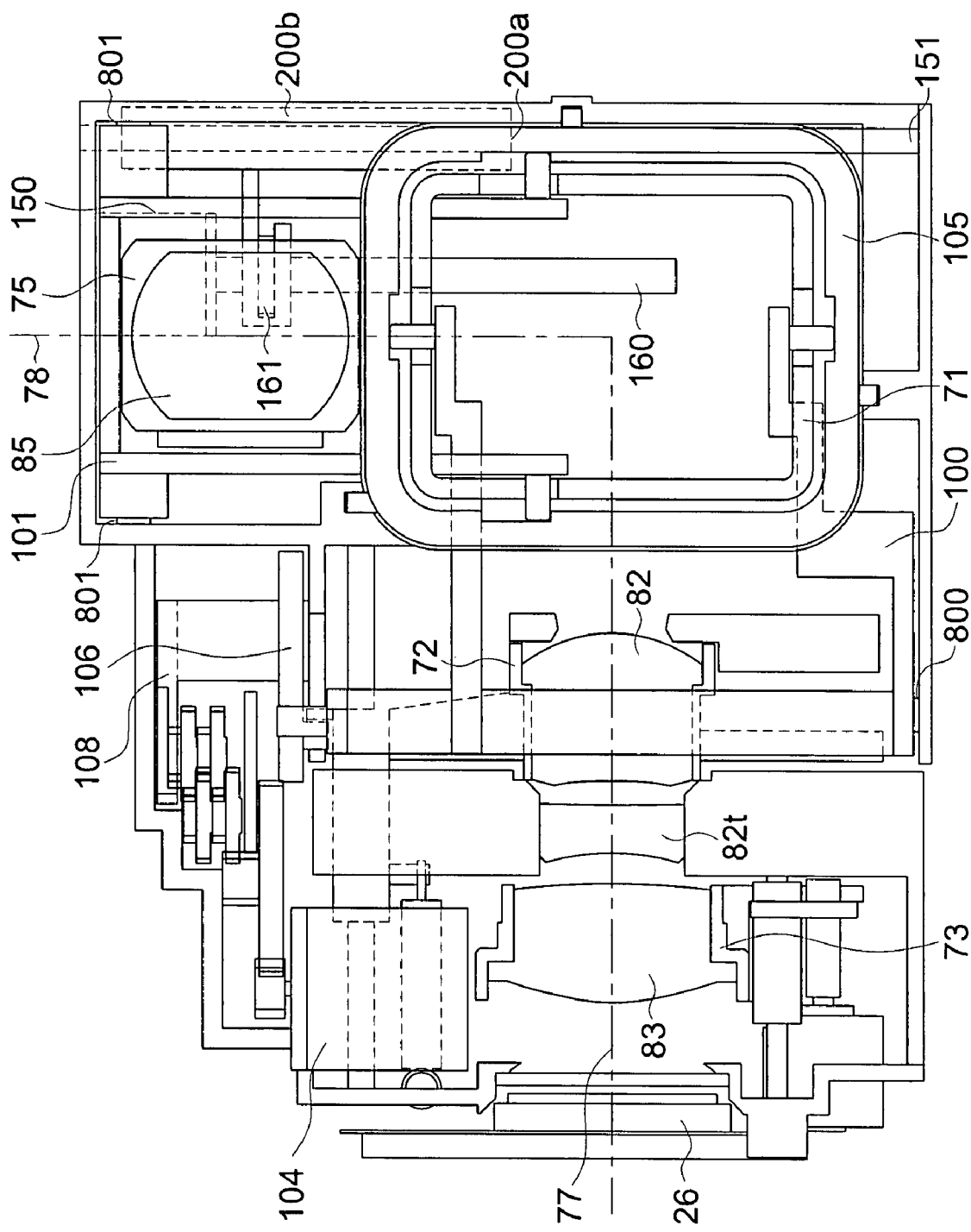
FIG. 8 is a front view of the lens unit of the first embodiment of this invention when collapsed.
Figure 9:
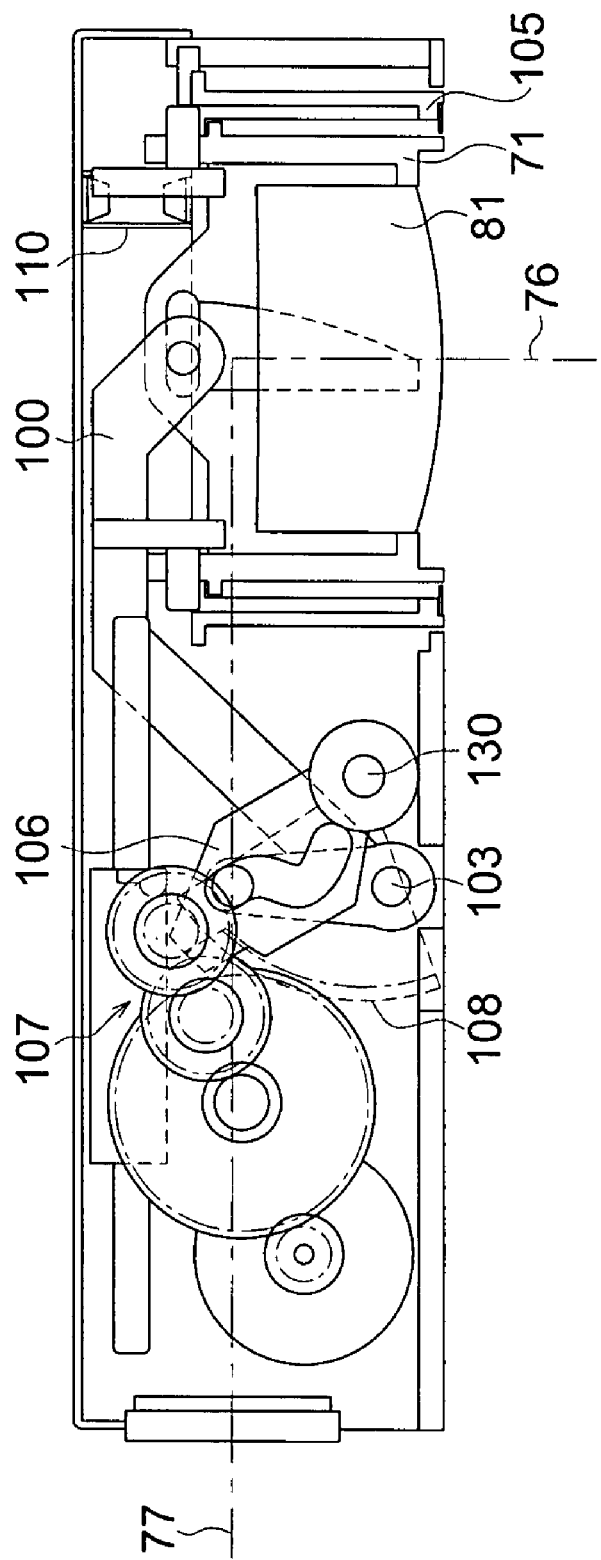
FIG. 9 is a side view of the lens unit of the first embodiment of this invention when collapsed.
Figure 10:
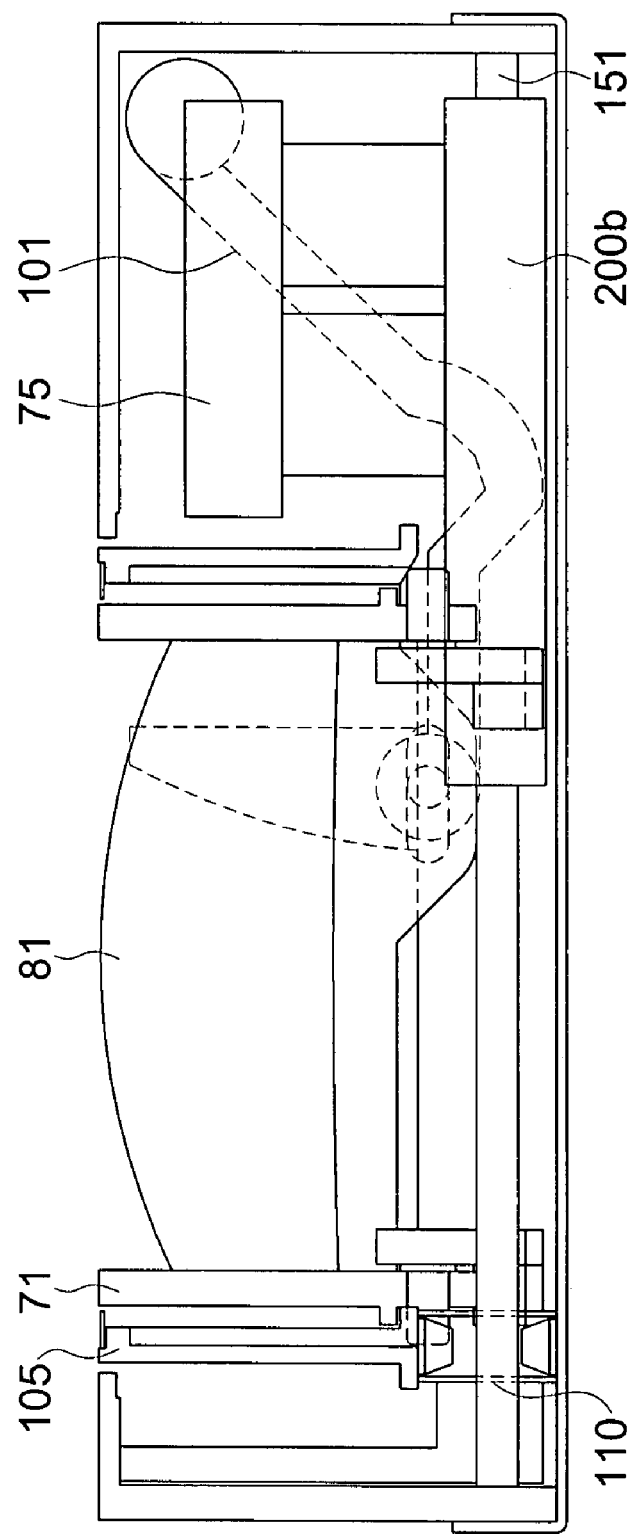
FIG. 10 is a top view of the lens unit of the first embodiment of this invention when collapsed.

FIG. 3 is front view of the lens unit 12 in the wide-angle state; FIG. 4 is a side view of the lens unit 12 in the wide-angle state; FIG. 5 is a side view of the lens unit 12 in the telephoto state; FIG. 6 and FIG. 7 show a side view and top view of the first holding member when collapsed or at the position where the first holding member is moved at startup time (bending member inserting and removing position); FIG. 8, FIG. 9 and FIG. 10 respectively show a front view, a side view and a top view of the collapsed state. The side view is used for describing the first moving member for zooming and the first lens group and does not show the bending member, and the second and third lens groups.

First, the structure of the lens unit 12 will be described using FIG. 3 to FIG. 5.

Starting from the object side, the photographing lens comprises a first lens group 81, a mirror 85 as the bending member, a second lens group 82 which is positioned at the image side of the first lens group 81 and a third lens group 83 which includes image stabilizer lens group 83t. The first lens group 81 is on the first optical axis 76, and the second lens group 82 and the third lens group 83 are successive lens and are on the second optical axis 77. The photographing lens forms an image of a light from the object on the image pickup element 26.

The mirror 85 is between the first lens group 81 and the second lens group 82 and is disposed such that its reflection surface forms a 45° angle with respect to the first optical axis 76 and the second optical axis 77, and the first optical axis 76 is bent substantially at right angles to the direction of the second optical axis 77.

During zooming, the first lens group 81, the second lens group 82, and the third lens group 83 move, and during focusing, the third lens group 83 moves. The image stabilizer lens 83t is a fixed lens group.

The structure of movement for zooming will be described next. When zooming is done from the wide-angle end to the telephoto end, the first lens group 81 is moved to the object side and the second lens group 82 is moved to the mirror 85 side and the third lens group 83 is moved to the image pickup element 26 side.

The structure which causes the first holding member 71 as the first movable frame for holding the first lens group 81 to move for zooming, is provided with the first holding member 71; the drive arm 100 which is the support and drive member which engage with the first holding member 71; and a driven arm 101 which is the support and drive member for restraining the posture of the first holding member 71 in conjunction with the drive arm 100. Each of the drive arm 100 and the driven arm 101 is provided with two arm portions which interposes the optical axis 76, and the coupling member which connects the two arm portions, thereby forming a U shape.

The drive arm 100 is provided with guide pins 100a and 100b at one end of the arm portion, and similarly, the driven arm 101 is provided with driven pins 101a and 101b at one end of the arm portion. Guide grooves 711, 712, 713 and 714 constituted of respective elongated holes are formed on the first holding member 71. The guide pins 100a and 100b as well as the driven pins 101a and 101b are engaged with the guide grooves 711, 712, 713 and 714, respectively, thereby forming the first engagement portion. At the first engagement portion, the drive arm 100 and the driven arm 101 are rotatable.

The rotating axes (center axis for the guide pins 100a and 100b and the center axis for the driven pins 101a and 101b) of the drive arm 100 and the driven arm 101 are orthogonal to each other on a plane which includes the respective first engagement portions and is perpendicular to the optical axis 76. The plane that is perpendicular to the optical axis 76 may be the same plane or may be separated into two planes.

The drive arm 100 and the driven arm 101 have a second engagement portion 800 and 801, respectively, at the other end of the arm portion which is opposite to the one end of the arm portion having the first engagement portion. The second engagement portions 800 and 801 are pivotally supported on the main frame 70.

The straight advance barrel (also referred to as second movable frame) 105 is coaxially disposed on the outer surface of the holding member 71, which is movable back and forth in the direction of the optical axis 76, thereby constituting the lens barrel. The first holding member 71 and the straight advance barrel 105 are movable back and forth with respect to the main frame (stationary main frame). Further, the straight advance barrel 105 engages with the first holding member 71, and is urged by the spring 110 toward the object side.

In addition, the second engagement portion 800 of the drive arm 100 is pivotally supported on the main frame 70 at the side where the first holding member 71 moves back and forth, and when the first holding member 71 moves to the telephoto state (FIG. 5) in which it is furthest from the main frame 70, one portion of the arm has a bent shape in which a run-off portion 100g is provided so as to be substantially perpendicular to the optical axis 76. By providing the run-off section 100g, a run-off space is formed in which the arm can move without contacting the prism.

Figure 11:
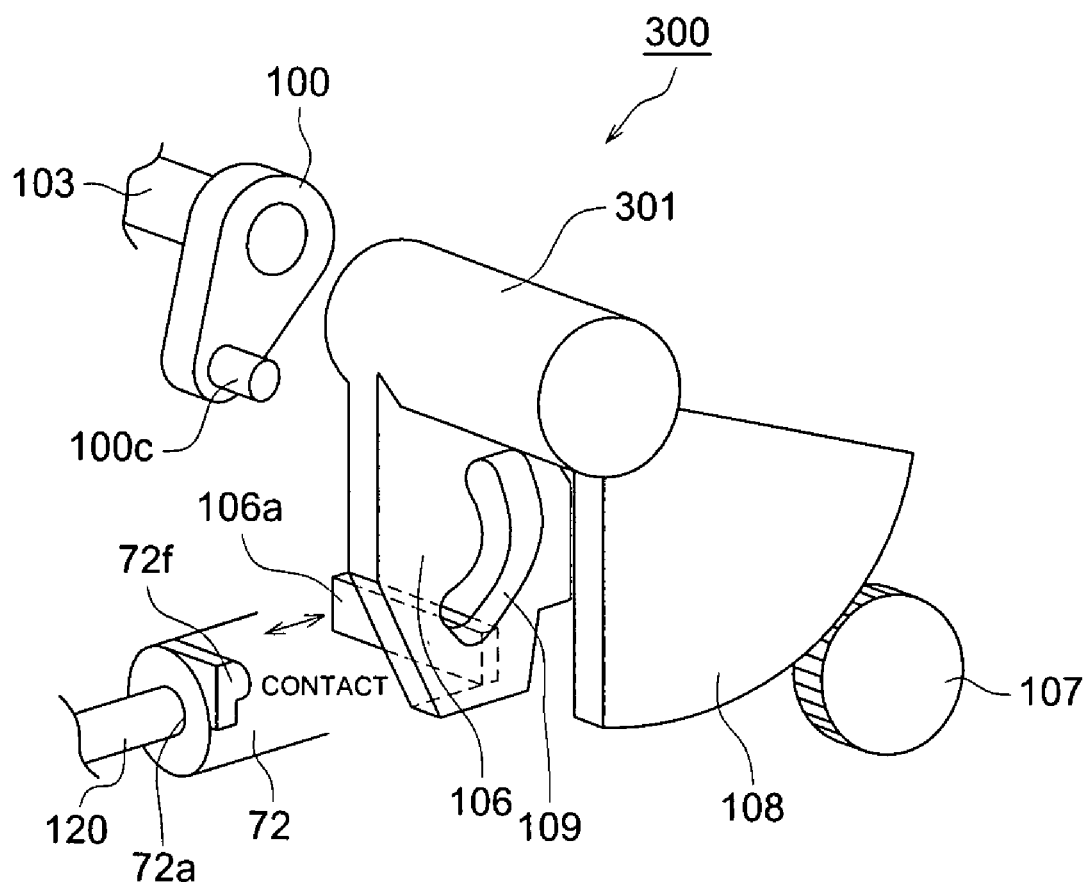
FIG. 11 is a schematic perspective view in the periphery of the coupling member of the first embodiment of this invention.

The first holding member 71 is formed of a square-shaped tubular frame, and the U-shaped arms of the drive arm 100 and the driven arm 101 are orthogonal to each other and as a result, the first holding member 71 moves along the optical axis 76 and restrains the posture of the first holding member 71 such that there is no rotational operation about the optical axis 76. In addition, because the structure is such that the arm portions of the drive arm 100 and the driven arm 101 move slidingly on the inner surface of the first holding member 71, smoother straight advance movement becomes possible. In the first holding member 71, the drive arm 100 is rotated about the drive arm shaft 103 as the coupling portion which couples the arm portions to thereby transmit the rotational force to the first holding member 71 by the guide pins 100a and 100b, and the rotational force is converted to a force which moves linearly and parallel to the optical axis 76. The drive arm shaft 103 is pivotally supported by the second engagement portion 800 (only one side is shown). The rotational force for the drive arm 100 is transmitted to the drive arm 100 by the first motor 104 which is the actuator, the gear train 107 and the coupling plate 106 which forms the cam mechanism by the guide pin 100c provided on the drive arm shaft 103, and the rotational force that is transmitted to the drive arm 100 is converted to moving force in the direction of the optical axis 76 of the first holding member and straight advance movement occurs. The peripheral portion of the coupling member 300 is shown as a schematic perspective view in FIG. 11. The coupling plate 106 forms a portion of the coupling member 300 and rotates about the support shaft 301.

The contact portion 105b of the straight advance mount 105 is urged by a spring force to the bottom portion 716 of the first holding member 71 using the straight advance mount compression spring 110 and thus the straight advance mount 105 moves to the object side along with the movement of the first holding member 71 and stops where the bottom portion 105a of the straight advance mount 105 contacts the main frame 70. After the bottom portion 105a of the straight advance mount 105 contacts the main frame 70 and stops, the first holding member 71 moves to the object side and arrives at the telephoto end. As described above, the drive arm 100 comprises a first moving member for zooming (also called first drive mechanism), which moves the first holding member 71.

When the first motor 104 which is the actuator rotates, the rotational drive force which decelerates at the decelerating gear train 107 rotates the folding-fan shaped gear member 108 of the coupling member 300.

The rotational force from the last gear of the gear train 107 which transmits rotational force from the first motor 104 is transmitted to the folding-fan shaped gear member 108, and the rotational force from the folding-fan shaped gear member 108 is transmitted to the drive arm 100 by the guide pin 100c that engages with the coupling plate groove 109, and when the drive arm 100 rotates about the drive arm shaft 103, the first holding member 71 is moved so as to advance straight in the direction of the optical axis 76 via the guide grooves 711 and 712 of the first holding member 71 which are engaged with the guide pins 100a and 100b and the first holding member 71 is fed to the object side and reaches the telephoto end. When the first holding member 71 moves straight, the movement force is transmitted to driven pins 101a and 101b of the driven arm 101 which engages with the guide grooves 713 and 714, and the driven arm 101 moves in conjunction with the movement of the first holding member. At this time, the inside surface of the first holding member 71 and the outside surface of driven arm 101 slide to thereby restrict the movement which the first holding member 71 attempts to rotate.

The structure of movement for zooming of the second holding member 72 will be described. The first guide shaft 120 is arranged parallel to the second optical axis 77 and both ends thereof are fixed to the wall surfaces 70d and 70e of the main body 70. In addition, the first guide shaft 120 fits into the slide guide hole 72a of the second holding member 72 which is the guide member and the second holding member 72 is guided so that it can move towards the second optical axis 77 without inclining with respect to the second optical axis 77. At this time, rotation around the first guide shaft 120 is restricted by the straight advance guide groove which is not shown.

Furthermore, the second holding member 72 is urged by a spring force to the image pickup element 26 side in the second optical axis 77 direction by the second spring 72b and the guide pin 72f of the second holding member 72 contacts the displacement contact portion 106a of the coupling plate 106. When the displacement contact portion 106a is always in contact with the guide pin 72f due to the rotation of the coupling plate 106, the second holding member 72 moves for zooming. In this manner the coupling plate 106 is the second moving member for zooming (also called the second drive mechanism) and at the same time, moves the first displacement moving member and the second displacement moving member so that they are operated in conjunction with each other.

The structure of moving for zooming of the third holding member 73 will be described next. The third guide shaft 61 is arranged parallel to the second optical axis 77 and one end thereof is fixed to the wall surface 70d of the main body 70 and the other end is fixed to the middle wall surface 70f. The third guide shaft 61 fits into the slide guide hole 73a of third holding member 73 and third holding member 73 is guided so that it can move towards the second optical axis 77 without inclining with respect to the second optical axis 77. The third drive shaft 62 which is coupled with the rotational shaft of the third motor 63 is arranged parallel to the second optical axis 77 and a helicoid screw is formed at the outer surface thereof and it screws into the engagement screw 73b of the third holding member 73 and rotation of the area around the third guide shaft 61 is restricted by the straight advance guide groove which is not shown.

When the third motor 63 rotates, the third holding member 73 moves to the image pickup element 26 side by the lead of the third drive shaft 62 and arrives at the telephoto end.

Next, the operation will be described.

First, the operation from the wide-angle end in FIG. 4 to the telephoto end in FIG. 5 will be described.

When the decelerating gear train 107 in FIG. 4 is driven by the driving of the first motor, the folding-fan shaped gear member 108 which is a portion of the coupling member 300 rotates around the coupling plate shaft 130. The coupling plate groove 109 of the coupling plate 106 rotates around the coupling plate shaft 130 along with the rotation of the folding-fan shaped gear member 108 and the guide pin 100c which engages with the coupling plate groove 109 moves along the coupling plate groove 109 and the drive arm 100 rotates about the drive arm shaft 103. The guide pins 100a and 100b transmit drive force to the guide groove 711 and 712 of the first holding member 71 that engages with the guide pins 100a and 100b due to the rotation of the drive arm 100 and the first holding member 71 moves to the object side along the optical axis 76. In addition, the displacement contact portion 106a presses the guide pin 72f of the second holding member 72 when the coupling plate 106 rotates and the second holding member 72 moves along the first guide shaft 120. The straight advance mount 105 moves to the object side in conjunction with the movement of the first holding member 71 when the contact portion 105b is in contact with the bottom portion 716 of the first holding member 71, and it stops where the bottom portion 105a of the straight advance mount 105 contacts the main body 70. After this, only the first holding member 71 moves to the object side. In addition, when the first holding member 71 moves, the guide groove 713 and 714 of the first holding member 71 move and the driven pins 101a and 101b of the driven arm 101 which engages with the guide grooves 713 and 714 move. In this manner, the outside surface of driven arm 101 and the inside surface of the first holding member 71 are slid and thus the first holding member can move smoothly along the optical axis 76. In this manner the first holding member reaches the telephoto end shown in FIG. 5.

Next, the zoom operation of the third holding member 73 will be described. When the third motor 63 rotates from the wide angle state, the third slide guide hole 73a of the third holding member 73 fits with the third guide shaft 61 and is guided to the second optical axis 77 direction by the lead of the third drive shaft 62 and thus advances straight to the image pickup element 26 side and arrives at the telephoto end.

The collapse operation will be described next.

As shown in FIG. 6 and FIG. 7, when collapsing is done, the first holding member 71 moves to the bending member inserting and removing position, and next, as shown in FIG. 8-FIG. 10, the mirror holding member 75 recedes along the axis 78 which is perpendicular to the optical axes 76 and 77 and then first holding member moves on the first optical axis 76 and stored into the space formed when the mirror 85 moves. At this time, the first holding member 71 and the second holding member 72 move on a interlocking basis.

When the first motor 104 is driven, the drive arm 100 rotates about the drive arm shaft 103 and the first holding member 71 moves to the prism inserting and removing position which is between the wide-angle end (wide end) and the telephoto end (tele end) (shown in FIG. 6 and FIG. 7). Next, the mirror holding member (bending section holding member) 75 which holds the mirror 85 recedes to the recede position. The mechanism for moving the mirror holding member 75 to the receded position will be described using FIG. 8 and FIG. 9. The mirror holding member 75 which holds the mirror 85 has a slide guide portion 200b and a slide guide hole 200a, and the slide guide hole 200a fits with the second guide axis 151 which is fixed to the main body 70. The slide guide portion 200b is moved by the bending section moving member which is formed of the drive shaft 160 which is driven by the second motor 150 and the engagement screw 161. The slide guide portion 200b is coupled to the engagement screw 161, and the drive shaft 160 rotates due to the rotation of the second motor 150 and the engagement screw 161 moves due to this rotation and thus the mirror holding member 75 moves along the second guide shaft 151 and retreats to the retreat position shown in FIG. 8 and FIG. 10.

Next, the first motor 104 is driven and due to the rotation of the drive arm 100, the first holding member 71 moves to the collapse position (shown in FIG. 9 and FIG. 10) and thus the movement of the third holding member may be restricted to the image side beyond the wide angle position by the restricting member which is not shown. In this case, the collapse operation ends when the guide pin 72f and the displacement contact portion 106a separate.

At startup time, movement is in the opposite order from the collapse operation. That is to say, the first holding member 71 moves to the bending member inserting and removing position. At this time, the drive arm 100 which moves the first holding member 71 becomes the first moving member. Next, the mirror holding member 75 moves to the bending position and then the first holding member 71 is moved to a desired variable power position by the zooming operation and photographing is carried out.

Second Embodiment

The structure of the lens unit 30 is described as the second embodiment.

Figure 12:
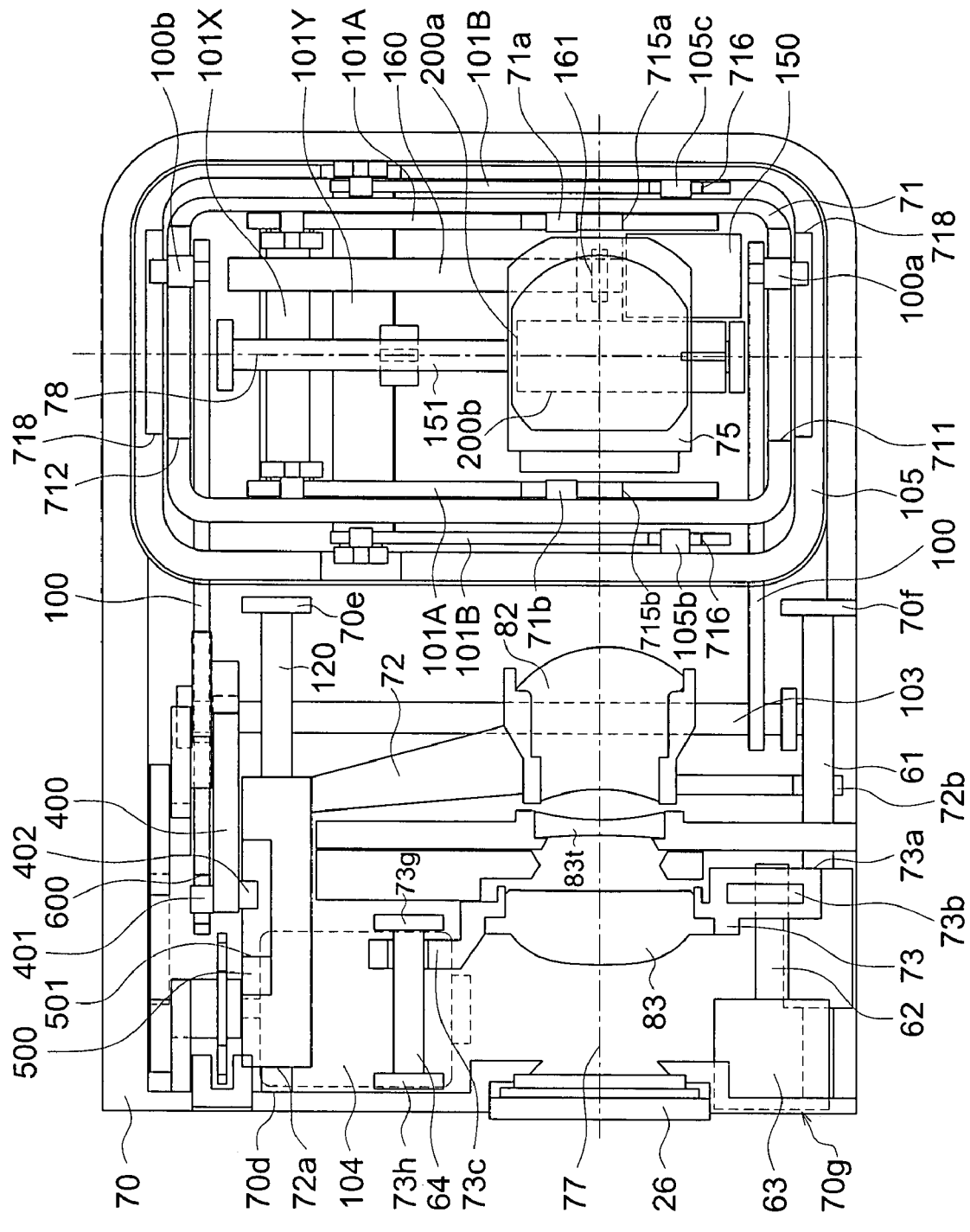
FIG. 12 is front view of the lens unit of the second embodiment of this invention.
Figure 13:
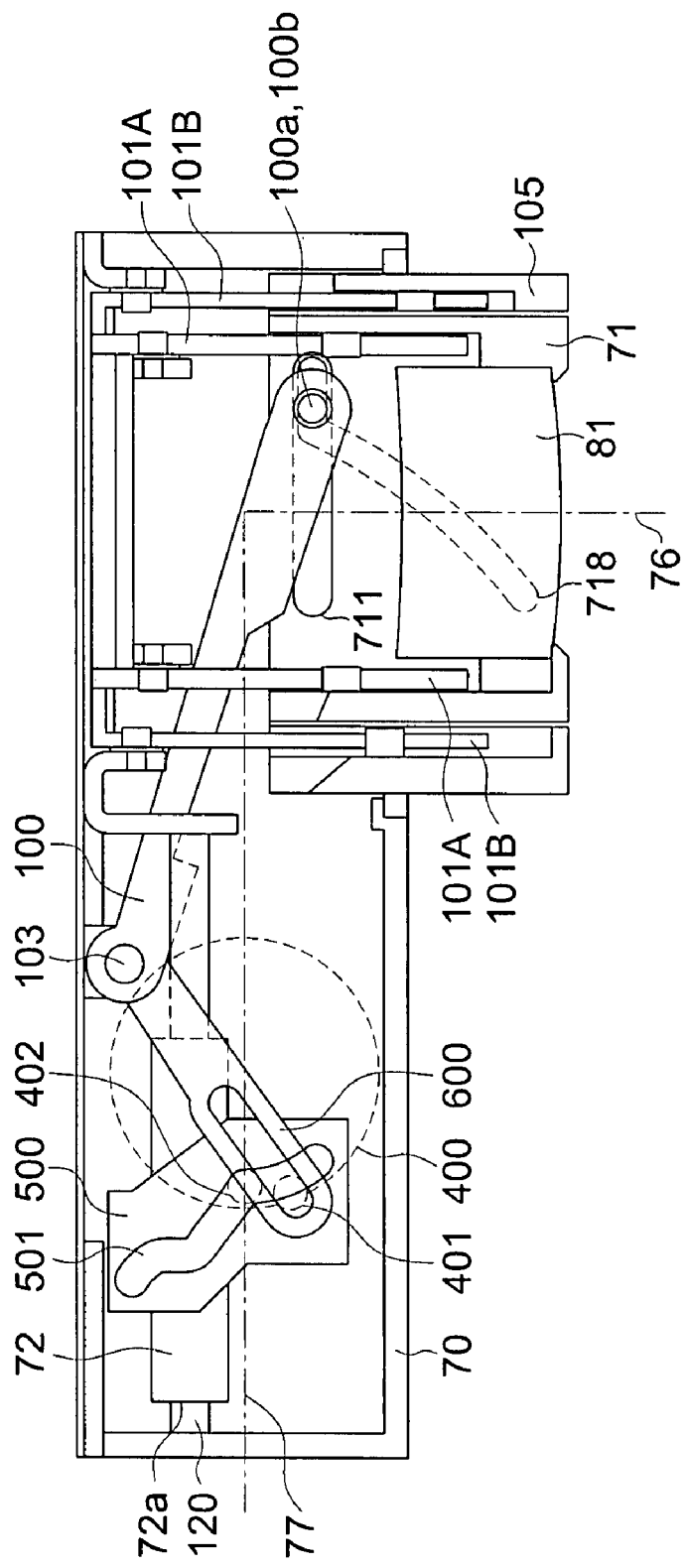
FIG. 13 is a side view of the lens unit of the second embodiment of this invention in the wide-angle state.
Figure 14:
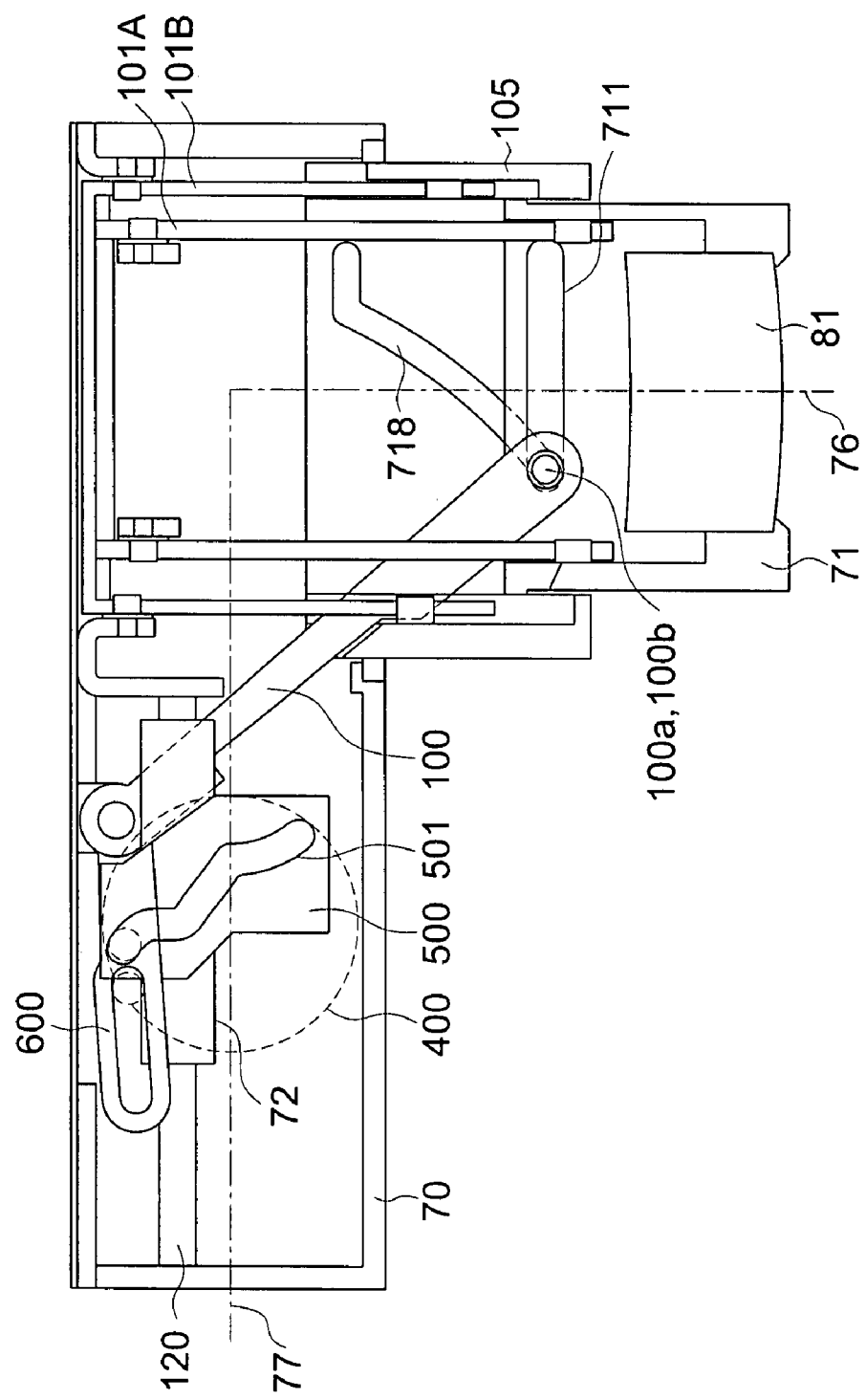
FIG. 14 is a side view of the lens unit of the second embodiment of this invention in the telephoto state.
Figure 15:
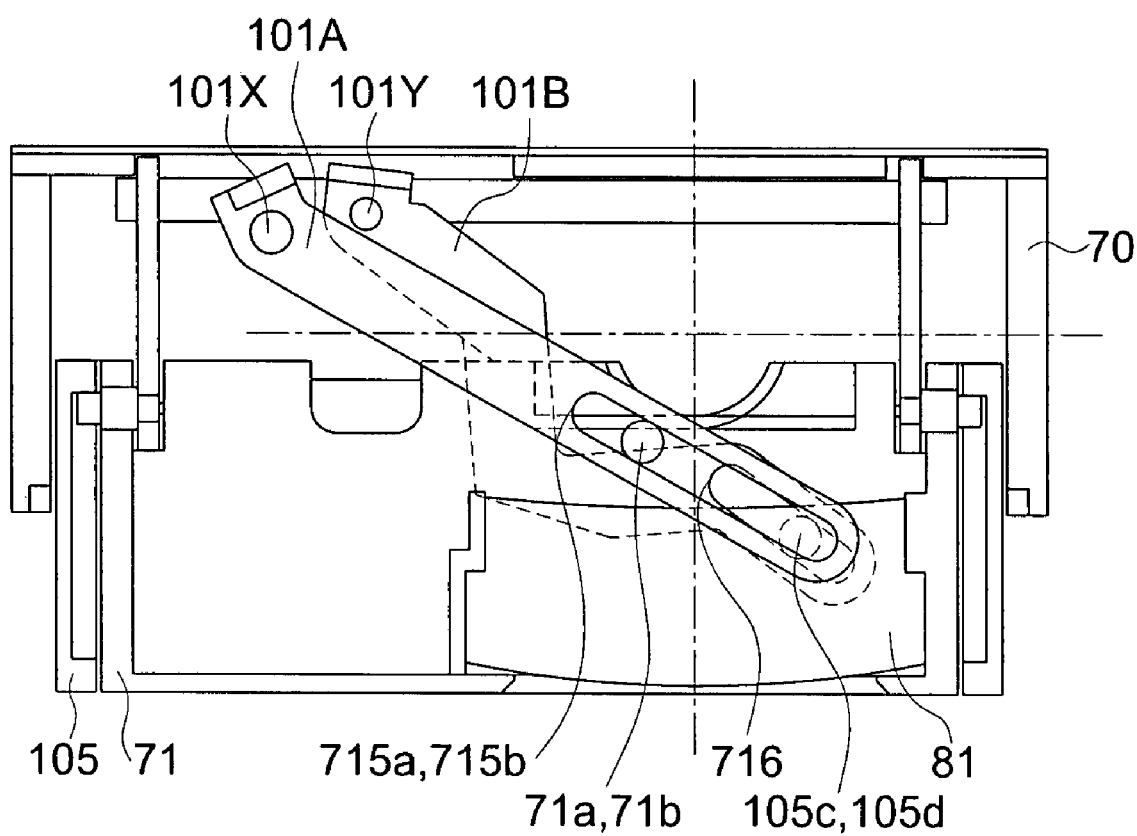
FIG. 15 is a top view of the lens unit of the second embodiment of this invention in the wide-angle state.
Figure 16:
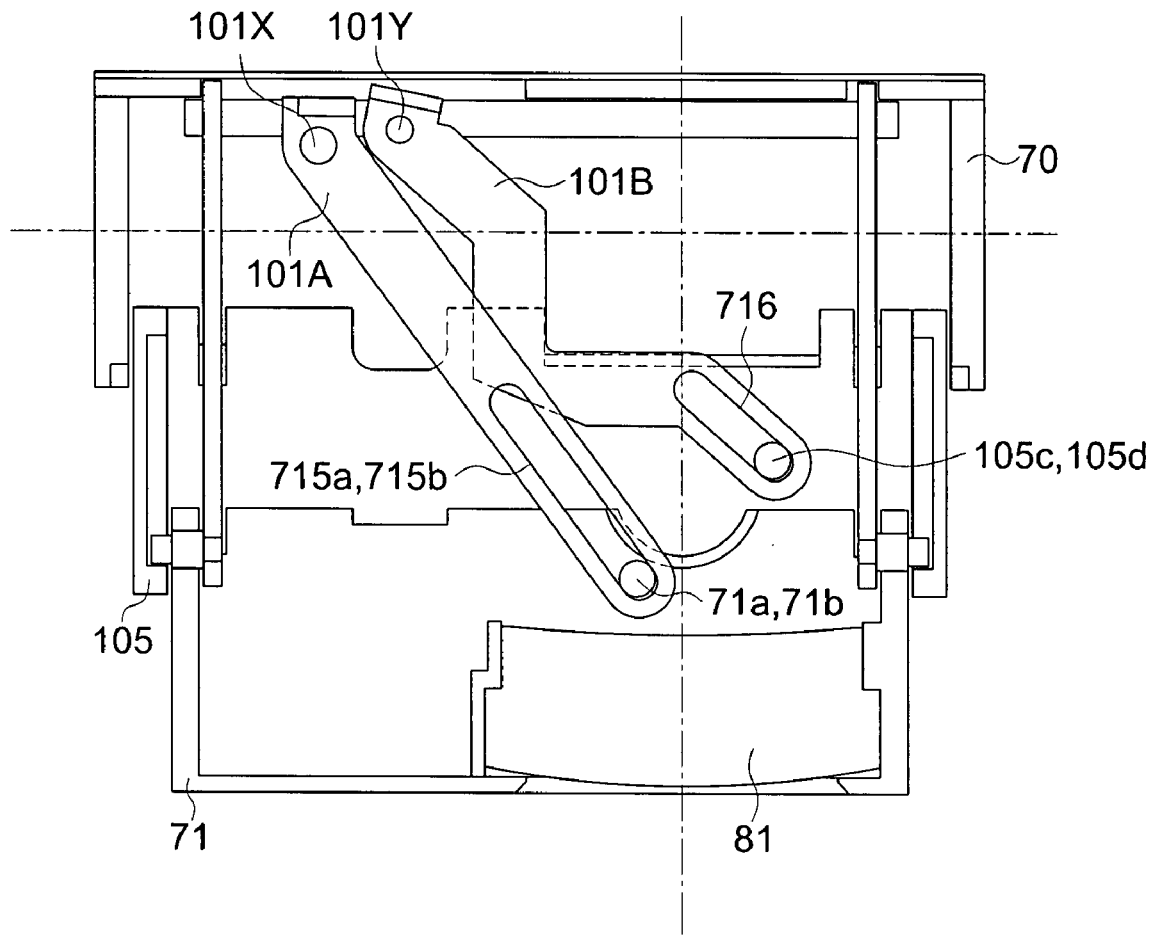
FIG. 16 is a top view of the lens unit of the second embodiment of this invention in the telephoto state.
Figure 17:
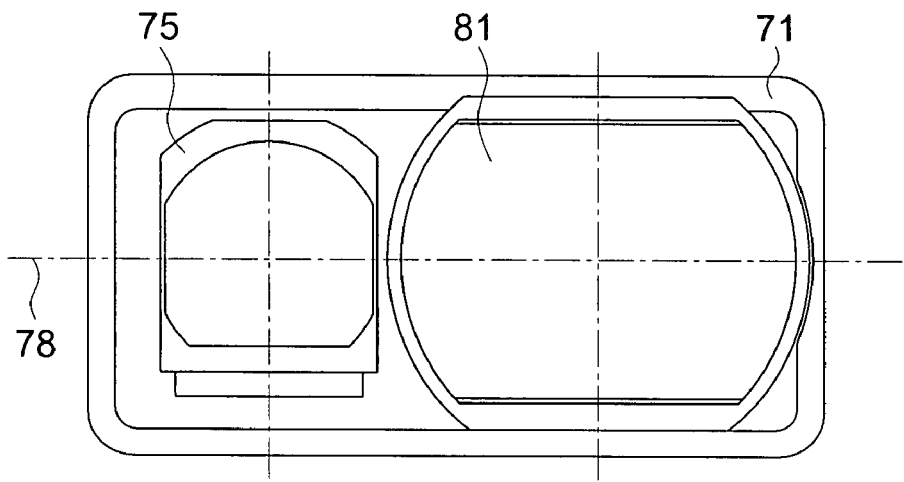
FIG. 17 is a portion of the front view of the lens unit of the second embodiment of this invention in the collapsed state.
Figure 18:
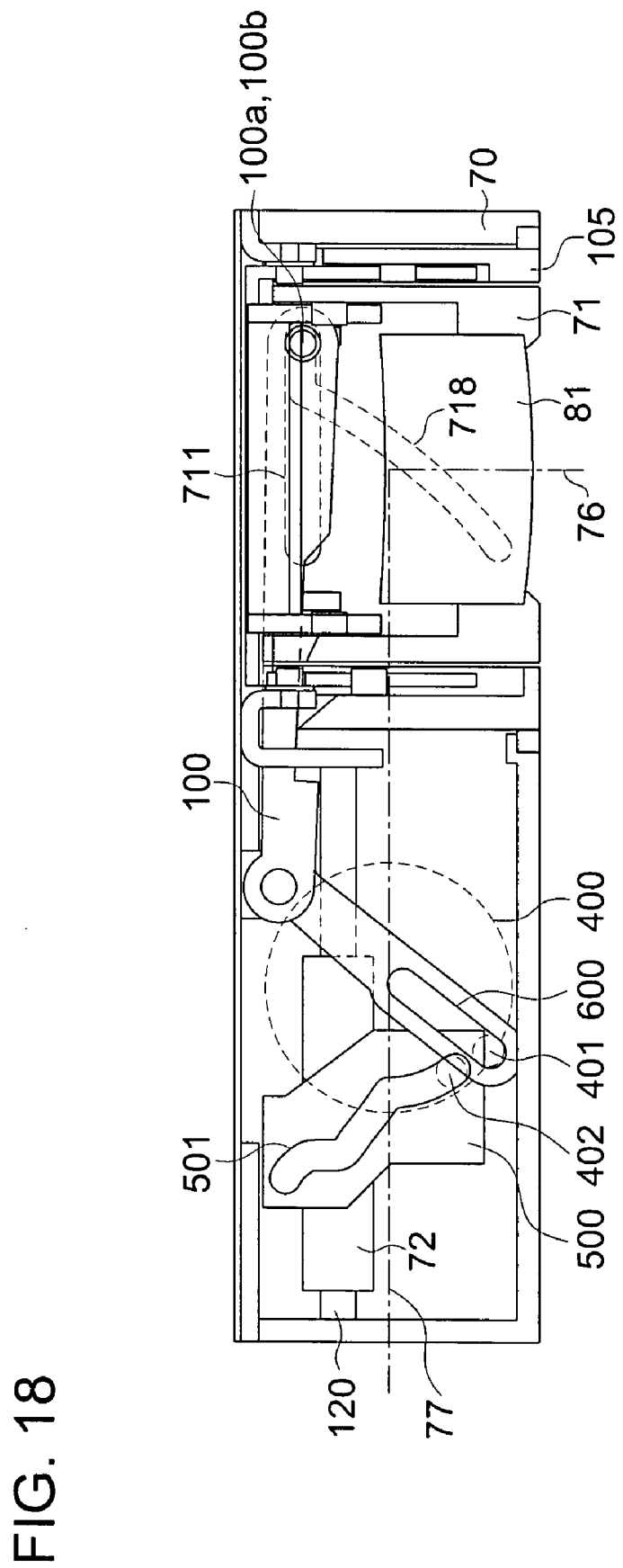
FIG. 18 is a side view of the lens unit of the second embodiment of this invention in the collapsed state.
Figure 19:
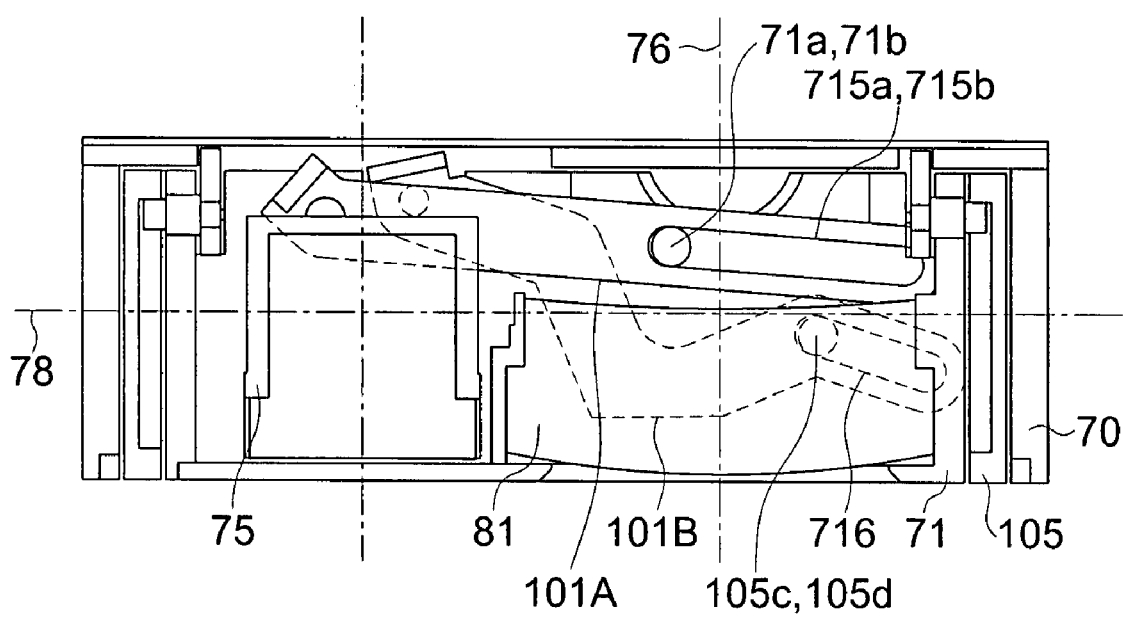
FIG. 19 is a top view of the lens unit of the second embodiment of this invention in the collapsed state.

FIG. 12 is front view of the lens unit 30 in the wide angle state; FIG. 13 is a side view of the lens unit 30 in the wide angle state; FIG. 14 is a side view of the lens unit 30 in the telephoto state; FIG. 15 is a top view of the lens unit 30 in the wide angle state; FIG. 16 is a top view of the lens unit 30 in the telephoto state; FIG. 17 is a main portion showing the front in the collapsed state and the retreat state of the bending section holding member; FIGS. 18 and 19 respectively show side view and the top view in the collapsed state. The side view is used for describing the movement of the first zooming and moving member and the first lens group without showing the second and third lens group. It is to be noted that the members which have the same functions as the first embodiment have been assigned the same reference numbers and descriptions thereof are not repeated.

The differences between the second embodiment and the first embodiment are: the second embodiment does not have the direct advance compression spring 110 which urges the straight advance mount 105 and it is moved by using the drive force from the drive arm 100; there are two sets of driven arms which are the first driven arm 101A and the second driven arm 101B which respectively restrict rotation at the time of movement of the first holding member 71 and the straight advance mount 105; and the coupling plate 400 which is the coupling member are shaped as discs which have gear grooves and have drive shafts (guide pins) 401 and 402 on both surfaces and the rotating force of the first motor rotates the coupling member 400 via the decelerating gear train 107 and the first lens group 81 and the second lens group 82 are driven on a interlocking basis by the respective drive shafts (guide pins) 401 and 402.

The structure of movement for zooming of the first lens group 81 and the second lens group 82 will be described in the following using FIG. 12 to FIG. 16.

The structure for moving for zooming of the first lens group 81 is provided with a first holding member 71 for holding the first lens group 81; a drive arm 100 which includes guide pins 100a and 100b which fit with the guide grooves 711 and 712 of the first holding member 71; a first driven arm 101A for restraining the posture of the drive arm 100 and the first holding member 71, and the driven arm 101A comprises driven grooves 715a and 715b which fit with the guide pins 71a and 71b of the first holding member 71. The outside of the first holding member 71 has a straight advance mount 105.

The holding member 71 is formed of a square-shaped tubular frame and by having such a configuration that the U-shaped arms of the drive arm 100 and the first driven arm 101 slides on the inner surface of the first holding member 71, the first holding member 71 thereby moves along the optical axis direction 76 and restrains the posture such that there is no rotational operation. In the first holding member 71, the drive arm 100 rotates about the drive arm shaft 103 to thereby transmit the rotational force to guide grooves 711 and 712 from the guide pins 100a and 100b, and the rotational force is converted to a force which moves the first holding member 71 linearly and parallel to the optical axis 76. The rotational force of the drive arm 100 is transmitted to the drive arm 100 by the first motor 104 which is the actuator, the gear train 107 and the coupling plate 400 which is the coupling member and which forms the cam mechanism. The area around the coupling member 400 is shown as a schematic perspective view in FIG. 20. The peripheral surface of the coupling plate 400 forms a gear which meshes with last gear of the gear train 107, and the outside surface of the coupling plate 400 has a guide pin 401 which fits with the guide groove 600 of the first holding member 71. When the coupling plate 400 rotates, the rotational force is transmitted to the drive arm 100 from the guide groove 600 and it rotates about the drive arm shaft 103. The rotational force that is transmitted to the drive arm 100 is converted to moving force in the direction of optical axis 76 of the first holding member 71 and straight advance movement occurs.

The straight advance mount 105 is constituted of a square-shaped tubular frame that is at the outside of the first holding member 71 and by having such a configuration that the U-shaped arm of the second drive arm 101B slides on the inner surface of the straight advance mount 105, the straight advance mount 105 thereby moves along the optical axis 76 and restrains the posture such that there is no rotational operation. Guide grooves 711 and 712 are provided on the first holding member 71 in the direction perpendicular to the optical axis 76. In addition, on the straight advance mount 105, there is provided guide groove 718 having a straight line portion which extends in the direction perpendicular to the optical axis 76, and a circular arc portion which extends along an arc in the oblique direction with respect to the optical axis 76. The center of the circular arc portion is the drive arm shaft 103 which is the rotation axis of the drive arm 100. In the straight advance mount 105, the drive arm 100 rotates about the drive arm shaft 103 to thereby transmit the rotational force to guide groove 718 from the guide pins 100a and 100b, and the rotational force is converted to a force which moves the straight advance mount 105 linearly and parallel to the optical axis 76.

That is to say, the guide pins 100a and 100b of first coupling member of the drive arm 100 penetrate the guide grooves 711, 712 and 718 which are the elongated holes in the first holding member 71 and straight advance barrel 105.

The straight advance mount 105 advances straight along the optical axis 76 with the holding member 71 at the portion where the shape of the guide groove 718 is linear, and it does not move at the arc-shaped portion and only the first holding member 71 moves.

When the first motor 104 which is the actuator rotates, the rotation drive force that was reduced by the deceleration gear train 107 rotates the gear portion at the peripheral surface of the coupling plate 400.

The rotational force from the last gear of the gear train 107 which transmits rotational force from the first motor 104 is transmitted to the gear section on the periphery of the coupling plate 400, and the rotational force from the gear portion is transmitted to the guide groove 600 of the drive arm 100 that engages with the guide pin 401, via the guide pin 401 that is formed on the outside surface of the coupling plate 400 and the drive arm 100 rotates about the drive arm shaft 103. When the drive arm 100 rotates, the first holding member 71 moves so as to advance straight in the direction of the optical axis 76 via the guide grooves 711 and 712 of the first holding member 71 which are engaged with the guide pins 100a and 100b and the first holding member 71 is fed to the object side and reaches the telephoto end. When the first holding member 71 moves straight, the driven arm 101A moves in conjunction with the movement of the first holding member 71 via the driven grooves 715a and 715b which engage with the guide pins 71a and 71b. At this time, the inside surface of the first holding member 71 and the outside surface of the first driven arm 101 slide to thereby restrict the movement which the first holding member 71 attempts to rotate.

The structure of movement for zooming of the second holding member 72 will be described. The first guide shaft 120 is arranged parallel to the second optical axis 77 and both ends thereof are fixed to the wall surfaces 70d and 70e of the main body 70. In addition, the first guide shaft 120 fits into the slide guide hole 72a of the second holding member 72 which is the guide member and the second holding member 72 is guided so that it can move towards the second optical axis 77 without inclining with respect to the second optical axis 77. At this time, rotation around the first guide shaft 120 is restricted by the shaft 61 and the slide portion 72b.

Furthermore, the second holding member 72 is provided with a cam plate 500 and the cam plate 500 includes a guide groove 501 that fits with a guide pin 402 that is formed on the inside surface of the coupling plate 400. When the coupling plate 400 rotates, the second holding member 72 is moved by displacement via the guide pin 402 and the guide groove 501.

In this manner, the first moving member 71 and the second moving member 72 are moved so that they operate in conjunction with each other due to the coupled portion of the guide pin 401 that is formed on one surface of the coupling plate 400 and the guide groove 600 of the first holding member 71 and the coupled portion of the guide pin 402 formed on the other surface and the guide groove 501 of the second holding member 72.

The structure of movement for zooming of the third holding member 73 will be described next. The third guide shaft 61 is arranged parallel to the second optical axis 77 and one end thereof is fixed to the wall surface 70g of the main body 70 and the other end is fixed to the middle wall surface 70f. The third guide shaft 61 fits into the slide guide hole 73a of third holding member 73 and third holding member 73 is guided so that it can move towards the second optical axis 77 without inclining with respect to the second optical axis 77. The third drive shaft 62 which is coupled with the rotational shaft of the third motor 63 is arranged parallel to the second optical axis 77, and a helicoid screw is formed at the outer surface thereof and it screws into the engagement screw 73b of the third holding member 73. The shaft 64 is fixed to the 73g and 73h and is guided along with 73c in the direction of optical axis 77.

When the third motor 63 rotates, the third holding member 73 moves to the image pickup element 26 side by the lead of the third drive shaft 62 and arrives at the telephoto end.

Next, the operation will be described.

First, the operation from the wide-angle end in FIG. 12, FIG. 13 and FIG. 15 to the telephoto end in FIG. 14 and FIG. 15 will be described.

When the decelerating gear train 107 in FIG. 12 is driven by the driving of the first motor 104, the gear section of the coupling plate 400 rotates. When the guide pin 401 at the outside surface of the coupling plate 400 rotates along with the rotation of the gear section, the drive arm 100 which has a guide groove 600 which fits with the guide pin 401 rotates about the drive arm shaft 103. The guide pins 100a and 100b transmit drive force to the guide grooves 711 and 712 of the first holding member 71 which engage with the guide pins 100a and 100b by the rotation of the drive arm 100, and the first holding member 71 moves to the object side along the optical axis 76. In addition, the guide pin 402 on the inside surface of the coupling plate 400 presses the guide groove 501 that is formed on the cam plate 500 of the second holding member 72 along with the rotation of the coupling plate 400, and the second holding member 72 moves along the first guide shaft 120. In addition, the straight advance mount 105 moves in conjunction with the movement of the guide pins 100a and 100b of the drive arm 100 to the object side using the guide groove 718 which fits with the guide pins 100a and 100b, and then stops at the position where the guide pins 100a and 100b are removed from the linear part of the guide groove 718. After this, only the first holding member 71 moves to the object side. The guide pins 71a and 71b of the first holding member 71 move along with the movement of the first holding member 71 and the driven grooves 715a and 715b of the first driven arm 101A which engages with the guide pins 71a and 71b move. In addition, the driven groove 716 of the second driven arm 101B which engages with the guide pins 105c and 105d of the straight advance mount 105 moves with the movement of the straight advance mount 105.

In this manner, the outside surface of driven arm 101A and the inside surface of the first holding member 71 are slid and thus the first holding member can move smoothly along the optical axis 76. Also by sliding the outside surface of the second driven arm 101B and the outside surface of the first holding member 71, the straight advance mount 105 can be moved smoothly along the optical axis 76. In this manner it reaches the telephoto end shown in FIG. 14 and FIG. 16.

Next, the zooming operation of the third holding member 73 will be described. When the third motor 63 rotates from the wide-angle state, the third holding member 73 is guided toward the second optical axis 77 when the third slide guide hole 73a fits together with the third guide shaft 61 by the lead of the third drive shaft 62 and thus advances straight to the image pickup element 26 side and arrives at the telephoto end.

Next, the collapsing operation will be described.

At the time of collapsing, as shown in FIG. 13 and FIG. 15, the first holding member 71 moves to the wide angle position, and next as shown in FIG. 17 to FIG. 19, the mirror holding member 75 retreats at the axis 78 perpendicular to the optical axes 76 and 77 and then the first holding member 71 moves on the optical axis 76 and stored into the space formed when the mirror 85 moves. The first holding member 71 and the second holding member 72 move on a interlocking basis.

When the first motor 104 is driven, the drive arm 100 rotates about the drive arm shaft 103 and the first holding member 71 moves to the prism inserting and removing position which is the wide-angle end. Next, the mirror holding member (bending section holding member) 75 which holds the mirror 85 recedes to the recede position. The mechanism for moving the mirror holding member 75 to the retreat position will be described using FIG. 12 and FIG. 17. The mirror holding member 75 which holds the mirror 85 comprises a slide guide portion 200b and a slide guide hole 200a, and the slide guide hole 200a fits with the second guide axis 151 that is fixed to the main frame 70. The slide guide portion 200b is moved by the bending section moving member which is formed of the drive shaft 160 which is driven by the second motor 150 and the engagement screw 161. The slide guide portion 200b is coupled to the engagement screw 161, and the drive shaft 160 rotates due to the rotation of the second motor 150 and the engagement screw 161 moves due to this rotation and thus the mirror holding member 75 moves along the second guide shaft 151 and retreats to the retreat position shown in FIG. 17.

Next, the first motor 104 is driven and due to the rotation of the drive arm 100, the first holding member 74 moves to the collapse position (See FIG. 18 to FIG. 20) and thus the collapse operation ends.

At startup time, movement is in the opposite order from the collapse operation. That is to say, the first holding member 71 moves to the wide-angle position. Next, the mirror holding member 75 moves to the bending position.

What is claimed is:

1. A lens barrel which holds a lens, comprising:
   (a) a stationary main frame;
   (b) a plurality of movable frames that are coaxially disposed to be movable back and forth relative to the stationary main frame in a direction of an optical axis of the lens barrel and are inserted telescopically into the stationary frame, the plurality of movable frames including:
   a first movable frame which moves to a farthest position away from the stationary main frame; and
   a second movable frame which moves to a next farthest position close to the farthest position where the first movable frame moves, at which the second movable frame is engaged with the first movable frame; and
   (c) two U-shaped support and drive members each having a first engagement portion, which is rotatably engaged with a periphery of the first movable frame on the same plane or two planes perpendicular to the optical axis, pivots of the support and drive members being orthogonal to each other;
   wherein each of the support and drive members comprises two arm portions which are engaged with the first movable frame at the first engagement portion, a second engagement portion which is engaged with the stationary main frame on an opposite side of the first engagement portion, and a coupling member which connects the two arm portions;
   wherein the second engagement portion is pivotally supported on the stationary main frame, the first movable frame is driven by at least one of the support and drive members;
   wherein the arm portions of the first engagement portion have a pin, and the first movable frame has an elongated hole which is engaged with the pin at the first engagement portion; and
   wherein the second movable frame has an elongated hole, and the pin of the arm portion of the support and drive member which drives the first movable frame, penetrates the elongated holes of the first and second movable frames.

2. The lens barrel of claim 1, wherein one of the two support and drive members follows movement of the first movable frame that the other support and drive member drives.

3. The lens barrel of claim 2, wherein the first movable frame has a square-shaped mount, when the first movable frame is moved, the two support and drive members are in slidingly contact with an inner surface of the first movable frame.

4. The lens barrel of claim 1, wherein the plurality of movable frames are composed of the first and second movable frames, and when the first movable frame is moved from a collapsed state in which the first movable frame is stored in the stationary main frame to a position in which the first movable frame is moved to a farthest position away from the stationary main frame, the first movable frame is engaged with the second movable frame to a predetermined position.

5. The lens barrel of claim 4, wherein the elongated hole of the second movable frame has a straight line portion and a circular arc portion, the first and second movable frames are integrally moved when the pin of the arm portion of the support and drive member is engaged with the straight line portion, and the second movable frame is not moved when the pin of the first engagement portion is engaged with the circular arc portion.

6. The lens barrel of claim 1, further comprising a driven member that includes two arm portions, each of one ends of which is engaged with the second movable frame and each of the other ends of which is pivotally supported on the first movable frame, and follows movement of the second movable frame.

7. The lens barrel of claim 6, wherein the second movable frame has a square-shaped mount, when the second movable frame is moved, each of the arm portions of the driven member are in slidingly contact with an inner surface of the second movable frame.

8. A lens barrel which holds a lens, comprising:
(a) a stationary main frame;
(b) a plurality of movable frames that are coaxially disposed to be movable back and forth relative to the stationary main frame in a direction of an optical axis of the lens barrel and are inserted telescopically into the stationary frame, the plurality of movable frames including:
a first movable frame which moves to a farthest away position away from the stationary main frame; and
a second movable frame which moves to a next farthest position close to the farthest position where the first movable frame moves, at which the second movable frame is engaged with the first movable frame; and
(c) two U-shaped support and drive members each having a first engagement portion, which is rotatably engaged with a periphery of the first movable frame on the same plane or two planes perpendicular to the optical axis, pivots of the support and drive members being orthogonal to each other;
wherein each of the support and drive members comprises two arm portions which are engaged with the first movable frame at the first engagement portion, a second engagement portion which is engaged with the stationary main frame on an opposite side of the first engagement portion, and a coupling member which connects the two arm portions;
wherein the second engagement portion is pivotally supported on the stationary main frame, the first movable frame is driven by at least one of the support and drive members;
wherein the plurality of movable frames are composed of the first and second movable frames, and when the first movable frame is moved from a collapsed state in which the first movable frame is stored in the stationary main frame to a position in which the first movable frame is moved to a farthest position away from the stationary main frame, the first movable frame is engaged with the second movable frame to a predetermined position;
wherein the first movable frame comprises a first contact portion which comes in contact with the second movable frame when the lens barrel is collapsed, and the lens barrel further comprises an urging member which urges the second movable frame toward the first contact portion and an object side; and
wherein the stationary frame comprises a second contact portion with which the second movable frame comes in contact, and when the first and second movable frames are moved from the collapsed state toward the object side, the first movable frame is integrally moved with the second movable frame until the second movable frame comes in contact with the second contact portion.

9. The lens barrel of claim 8, wherein after the second movable frame comes in contact with the second contact portion, movement of the second movable frame is stopped.

10. A lens unit comprising:
(a) a lens system which forms an image of a photographic object on an image pickup surface of an image pickup element, the lens system including a first lens group to which light from the object is incident, and a bending member which bends an optical axis of the first lens group substantially at a right angle, the bending member is held insertably and removably with respect to the optical axis; and
(b) a lens system holding member which holds the lens system, including a lens barrel which holds a lens further comprising:
(1) a stationary main frame;
(2) a plurality of movable frames that are coaxially disposed to be movable back and forth relative to the stationary main frame in a direction of an optical axis of the lens barrel and are inserted telescopically into the stationary frame, the plurality of movable frames including:
a first movable frame which moves to a farthest position away from the stationary main frame; and
a second movable frame which moves to a next farthest position close to the farthest position where the first movable frame moves, at which the second movable frame is engaged with the first movable; and
(3) two U-shaped support and drive members each having a first engagement portion, which is rotatably engaged with a periphery of the first movable frame on the same plane or two planes perpendicular to the optical axis, pivots of the support and drive members being orthogonal to each other;
wherein each of the support and drive members comprises two arm portions which are engaged with the first movable frame at the first engagement portion, a second engagement portion which is engaged with the stationary main frame on an opposite side of the first engagement portion, and a coupling member which connects the two arm portions;
wherein the second engagement portion is pivotally supported on the stationary main frame, the first movable frame is driven by at least one of the support and drive members.

11. A photographing apparatus comprising:
(a) the lens unit of claim 10; and
(b) an image pickup element which converts an image of the object formed by the lens system of claim 10 into electric signals.

12. The lens unit of claim 10, wherein in the lens barrel, the plurality of movable frames are composed of the first and second movable frames, and when the first movable frame is moved from a collapsed state in which the first movable frame is stored in the stationary main frame to a position in which the first movable frame is moved to a farthest position away from the stationary main frame, the first movable frame is engaged with the second movable frame to a predetermined position.

13. The lens unit of claim 12,
wherein the first movable frame comprises a contact portion which comes in contact with the second movable frame when the lens barrel is collapsed, and the lens barrel further comprises a urging member which urges the second movable frame toward the first contact portion,
wherein the stationary main frame comprises a second contact portion with which the second movable frame comes in contact, and when the first and second movable frames are moved from the collapsed state toward the object side, the first movable frame is integrally moved with the second movable frame until the second movable frame comes in contact with the second contact portion, and wherein after the second movable frame comes in contact with the second contact portion, movement of the second movable frame is stopped.

14. The lens unit of claim 12, wherein the arm portion of the support and drive member has a pin, the first movable frame has an elongated hole, the second movable frame has an elongated hole which has a straight line portion and a circular arc portion, wherein the pin of the support and drive portion which drives the first movable frame, penetrates the elongated holes of the first and second movable frames, and wherein the first and second movable frames are integrally moved when the pin of the arm portion of the support and drive member is engaged with the straight line portion, and the second movable frame is not moved when the pin of the arm portion of the support and drive member is engaged with the circular arc portion.

15. The lens unit of claim 12, wherein the bending member is inserted and removed at the predetermined position with respect to the optical axis.

16. The lens unit of claim 12, wherein the first movable frame has a square-shaped mount, when the first movable frame is moved, the two support and drive members are in slidingly contact with an inner surface of the first movable frame.

* * * * *